United States Patent
Shimada et al.

(10) Patent No.: US 10,235,005 B2
(45) Date of Patent: Mar. 19, 2019

(54) METHOD OF GENERATING DISPLAY NAME OF OBJECTS TO BE MANAGED

(71) Applicant: Hitachi, Ltd., Tokyo (JP)

(72) Inventors: Keita Shimada, Tokyo (JP); Mineyoshi Masuda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 138 days.

(21) Appl. No.: 15/325,449

(22) PCT Filed: Mar. 27, 2015

(86) PCT No.: PCT/JP2015/059538
§ 371 (c)(1),
(2) Date: Jan. 11, 2017

(87) PCT Pub. No.: WO2016/157276
PCT Pub. Date: Oct. 6, 2016

(65) Prior Publication Data
US 2017/0160842 A1 Jun. 8, 2017

(51) Int. Cl.
*G06F 3/048* (2013.01)
*G06F 13/14* (2006.01)
(Continued)

(52) U.S. Cl.
CPC ............ *G06F 3/048* (2013.01); *G05B 15/00* (2013.01); *G05B 19/00* (2013.01); *G06F 11/324* (2013.01); *G06F 13/14* (2013.01); *G06T 3/00* (2013.01); *G06F 2003/0695* (2013.01); *G06F 2206/1008* (2013.01); *G06T 2210/00* (2013.01)

(58) Field of Classification Search
None
See application file for complete search history.

(56) References Cited

U.S. PATENT DOCUMENTS

2002/0062364 A1 5/2002 Watanabe
2012/0257621 A1 10/2012 Ishii et al.
(Continued)

FOREIGN PATENT DOCUMENTS

JP 04-044162 A 2/1992
JP 2002-157177 A 5/2002
(Continued)

OTHER PUBLICATIONS

International Search Report of PCT/JP2015/059538 dated Jun. 23, 2015.

*Primary Examiner* — Thanh T Vu
(74) *Attorney, Agent, or Firm* — Mattingly & Malur, PC

(57) ABSTRACT

Pursuant to the increase in the number of objects to be managed and the complication of relations of the objects to be managed, the current condition is that the visibility of the GUI of management software is deteriorating. As one such current condition, there is a problem in that the display name of equipment to be managed on the GUI cannot be entirely displayed depending on the screen. Thus, the present invention improves the readability on the GUI by changing the display name according to the objective of the administrator by using a label in which the display name is divided into morphemes and the priority assigned thereto, as well as using topology information, and fitting the display name within the display area prepared on the screen.

12 Claims, 26 Drawing Sheets

(51) Int. Cl.
  *G05B 15/00*   (2006.01)
  *G05B 19/00*   (2006.01)
  *G06F 11/32*   (2006.01)
  *G06T 3/00*    (2006.01)
  *G06F 3/06*    (2006.01)

(56) References Cited

U.S. PATENT DOCUMENTS

2012/0320789 A1\* 12/2012 Wu .................... H04L 12/2809
                                                        370/254
2014/0143663 A1\*  5/2014 Delivett ................ G06F 17/211
                                                        715/256

FOREIGN PATENT DOCUMENTS

| | | |
|---|---|---|
| JP | 2003-122469 A | 4/2003 |
| JP | 2006-078360 A | 3/2006 |
| JP | 2007-272565 A | 10/2007 |
| JP | 2008-103788 A | 5/2008 |
| JP | 2012-088383 A | 5/2012 |
| JP | 2012-222580 A | 11/2012 |

\* cited by examiner

| MANAGEMENT OBJECT ID 701 | DISPLAY NAME 702 | MANAGEMENT IP 703 | OS 704 | MODEL 705 | MANAGEMENT OBJECT TYPE 706 |
|---|---|---|---|---|---|
| TENANT 1 | ABC corporation | — | — | — | TENANT |
| TENANT 2 | XYZ,Ltd | — | — | — | TENANT |
| SERVER 1 | Tokyo_Mail_WinServer_1 | 1.1.1.10 | COMPANY W OS | COMPANY A SERVER MODEL 1 | PHYSICAL SERVER |
| SERVER 2 | Tokyo_DB_WinServer_2 | 1.1.1.12 | COMPANY R OS | COMPANY A SERVER MODEL 1 | PHYSICAL SERVER |
| SERVER 3 | Tokyo_Hypervisor_1 | 1.1.1.11 | COMPANY V VIRTUALIZATION PLATFORM OS | COMPANY A BLADE SERVER MODEL 2 | PHYSICAL SERVER |
| VIRTUAL SERVER 1 | Tokyo_Web_VM1 | 1.1.1.14 | COMPANY R OS | COMPANY V VIRTUAL SERVER MODEL 1 | VIRTUAL SERVER |
| VIRTUAL SERVER 2 | Tokyo_Ftp_VM2 | 1.1.1.15 | COMPANY W OS | COMPANY V VIRTUAL SERVER MODEL 2 | VIRTUAL SERVER |

Fig.7A

| MANAGEMENT OBJECT ID | DISPLAY NAME | MANAGEMENT IP | OS | MODEL | MANAGEMENT OBJECT TYPE |
|---|---|---|---|---|---|
| NW-SW1 | Management-Net | 1.1.1.101 | — | COMPANY C IP NETWORK SWITCH MODEL 1 | NW-SW |
| NW-SW2 | Biz-Net | 1.1.1.102 | — | COMPANY D IP NETWORK SWITCH MODEL 1 | NW-SW |
| FC-SW1 | FC1 | 1.1.1.103 | — | COMPANY E FC SWITCH MODEL 1 | FC-SW |
| STORAGE 1 | ST1 | 1.1.1.201 | — | COMPANY H STORAGE MODEL 1 | Storage |
| Volume1 | 1 | — | — | — | Volume |
| Volume2 | 2 | — | — | — | Volume |
| Volume3 | 3 | — | — | — | Volume |
| Volume4 | 4 | — | — | — | Volume |
| ... | ... | ... | ... | ... | ... |

Fig. 7B

| MANAGEMENT OBJECT ID | ASSOCIATED NODE ID | TENANT ID | APPLICATION ID | DISPLAY NECESSITY |
|---|---|---|---|---|
| TENANT 1 | — | | | NECESSARY |
| TENANT 2 | — | | | NECESSARY |
| SERVER 1 | NW-SW1,NW-SW2,FC-SW1 | TENANT 1 | APPLICATION 1: Mail<br>APPLICATION 2: Printer | NECESSARY |
| SERVER 2 | NW-SW1,NW-SW2,FC-SW1 | TENANT 2 | APPLICATION 3<br>: Database | NECESSARY |
| SERVER 3 | NW-SW1,NW-SW2,FC-SW1,<br>VIRTUAL SERVER 1, VIRTUAL SERVER 2 | — | APPLICATION 5<br>: Hypervisor | NOT NECESSARY |
| VIRTUAL SERVER 1 | SERVER 3,NW-SW1,NW-SW2 | TENANT 1 | APPLICATION 6: Web<br>APPLICATION 7: DNS | NECESSARY |
| VIRTUAL SERVER 2 | SERVER 3,NW-SW1,NW-SW2 | TENANT 2 | APPLICATION 4<br>: FTP | NECESSARY |

Fig.8A

| MANAGEMENT OBJECT ID | ASSOCIATED NODE ID | TENANT ID | APPLICATION ID | DISPLAY NECESSITY |
|---|---|---|---|---|
| NW-SW1 | SERVER 1, SERVER 2, VIRTUAL SERVER 1, VIRTUAL SERVER 2, SERVER 3, STORAGE 1 | — | — | NOT NECESSARY |
| NW-SW2 | SERVER 1, SERVER 2, VIRTUAL SERVER 1, VIRTUAL SERVER 2 | — | — | NOT NECESSARY |
| FC-SW1 | SERVER 1, SERVER 2, SERVER 3 | — | — | NOT NECESSARY |
| STORAGE 1 | FC-SW1,Volume1,Volume2,Volume3,Volume4 | — | — | NOT NECESSARY |
| Volume1 | FC-SW1 | — | — | NECESSARY |
| Volume2 | FC-SW1 | — | — | NECESSARY |
| Volume3 | FC-SW1 | — | — | NECESSARY |
| Volume4 | FC-SW1 | — | — | NECESSARY |
| ... | | ... | ... | ... |

Fig.8B

| 901 TOPOLOGY ID | 902 TENANT ID | 903 APPLICATION ID | 904 NETWORK ID | 905 NODE ID | 906 NODE ID | 907 NODE ID | 908 NODE ID | 909 NODE ID | 910 NODE ID |
|---|---|---|---|---|---|---|---|---|---|
| Topo. 1 | TENANT 1 | BUSINESS APPLICATION 1 | NW-SW1 | SERVER 1 | FC-SW1 | Storage 1 | Volume 1 | — | ... |
| Topo. 2 | TENANT 1 | BUSINESS APPLICATION 2 | NW-SW1 | VIRTUAL SERVER 1 | SERVER 3 | FC-SW1 | Storage 1 | Volume 2 | ... |
| Topo. 3 | TENANT 2 | BUSINESS APPLICATION 3 | NW-SW1 | SERVER 2 | FC-SW1 | Storage 1 | Volume 3 | — | ... |
| Topo. 4 | TENANT 2 | BUSINESS APPLICATION 4 | NW-SW1 | VIRTUAL SERVER 2 | SERVER 3 | FC-SW1 | Storage 1 | Volume 4 | ... |
| ... | ... | ... | ... | ... | ... | ... | ... | ... | ... |

Fig. 9

| ACCOUNT ID | ACCOUNT NAME | ROLE | MANAGEMENT OBJECT ID |
|---|---|---|---|
| Ac.1 | Alice | INFRASTRUCTURE ADMINISTRATOR | TENANT 1, TENANT 2, BUSINESS APPLICATION 1, SERVER 1, SERVER 2, SERVER 3, VIRTUAL SERVER 1, VIRTUAL SERVER 2, STORAGE 1, FC-SW1,NW-SW1,NW-SW2,Volume1,Volume2, Volume3,Volume4 |
| Ac.2 | Bob | TENANT ADMINISTRATOR | TENANT 1, SERVER 1, VIRTUAL SERVER 1, Volume1,Volume2 |
| Ac.3 | Carol | TENANT ADMINISTRATOR | TENANT 2, SERVER 2, VIRTUAL SERVER 2, Volume3,Volume4 |
| Ac.4 | Dave | STORAGE ADMINISTRATOR | STORAGE 1,FC-SW1,Volume1,Volume2,Volume3,Volume4 |
| Ac.5 | Ellen | NETWORK ADMINISTRATOR | NW-SW1,NW-SW2 |
| Ac.6 | Frank | SERVER ADMINISTRATOR | SERVER 1, SERVER 2, SERVER 3, VIRTUAL SERVER 1, VIRTUAL SERVER 2 |
| ... | ... | ... | ... |

Fig.10

| RULE ID | ACCOUNT | MANAGEMENT OBJECT TYPE | ABBREVIATION METHOD | LINKING METHOD |
|---|---|---|---|---|
| R.1 | Ac.1 | TENANT, VIRTUAL SERVER, SERVER | LEAVE FIRST SECTION SEPARATED WITH HYPHEN, SPACE, COLON, SEMICOLON, PERIOD, OR UNDERSCORE | CAMEL CASE (LINK TERMS BY CAPITALIZING FIRST LETTER OF TERMS) |
| R.2 | Ac.2 | TENANT | LEAVE FIRST THREE CHARACTERS AND LAST CHARACTER | SNAKE CASE (LINK WITH _) |
| R.3 | Ac.3 | VIRTUAL SERVER | LEAVE FIRST TWO CHARACTERS AND LAST TWO CHARACTERS | CHAIN CASE (LINK WITH -) |
| ... | ... | ... | ... | ... |

Fig.11

| | 1201 | 1202 | 1203 | 1204 | 1205 |
|---|---|---|---|---|---|
| | LABEL ID | ACCOUNT ID | MANAGEMENT OBJECT ID | LABEL | PRIORITY |
| | L.1 | Ac.1 | TENANT 1 | ABC | 1 |
| | L.2 | Ac.1 | BUSINESS APPLICATION 1 | Mail | 2 |
| | L.3 | Ac.1 | NW-SW1 | Management | 3 |
| | L.4 | Ac.1 | VIRTUAL SERVER 1 | VM1 | 4 |
| | L.5 | Ac.1 | SERVER 1 | WinServ | 5 |
| | L.6 | Ac.1 | FC-SW1 | FC1 | 6 |
| | L.7 | Ac.1 | STORAGE 1 | ST1 | 7 |
| | L.8 | Ac.1 | Volume1 | 1 | 8 |
| | L.9 | Ac.1 | NW-SW2 | Biz | 9 |
| | ... | ... | ... | ... | ... |

Fig.12

| PATTEN ID | ROLE | PATTERN | EVALUATION FORMULA | HANDLING METHOD |
|---|---|---|---|---|
| P.1 | TENANT ADMINISTRATOR | ONLY NUMBERS | DISPLAY NAME A = [0 - 9] + | ADD NON-NUMERIC LABEL |
| P.2 | INFRASTRUCTURE ADMINISTRATOR | IDENTICAL CHARACTER STRING | DISPLAY NAME A = DISPLAY NAME B | ADD DIFFERENT NUMBER AT END |
| ... | ... | ... | ... | ... |

Fig.13

| DISPLAY AREA ID 1401 | ROLE 1402 | MANAGEMENT SCREEN 1403 | DISPLAY-TARGET MANAGEMENT EQUIPMENT ID 1404 | DISPLAYABLE AREA 1405 | UNNEEDED LABEL 1406 |
|---|---|---|---|---|---|
| D.1 | INFRASTRUCTURE ADMINISTRATOR | OVERALL RESOURCE SCREEN | TENANT 1 | 10 | TENANT |
| D.2 | INFRASTRUCTURE ADMINISTRATOR | OVERALL RESOURCE SCREEN | APPLICATION 1 | 10 | APPLICATION |
| D.3 | INFRASTRUCTURE ADMINISTRATOR | OVERALL RESOURCE SCREEN | VIRTUAL SERVER 1 | 10 | VIRTUAL SERVER |
| D.4 | INFRASTRUCTURE ADMINISTRATOR | OVERALL RESOURCE SCREEN | SERVER 1 | 10 | PHYSICAL SERVER |
| D.5 | INFRASTRUCTURE ADMINISTRATOR | OVERALL RESOURCE SCREEN | Volume1 | 10 | Volume |
| D.6 | INFRASTRUCTURE ADMINISTRATOR | OVERALL RESOURCE SCREEN | Volume2 | 10 | Volume |
| D.7 | INFRASTRUCTURE ADMINISTRATOR | OVERALL RESOURCE SCREEN | TENANT 2 | 10 | TENANT |
| D.8 | INFRASTRUCTURE ADMINISTRATOR | OVERALL RESOURCE SCREEN | APPLICATION 1 | 10 | APPLICATION |
| D.9 | INFRASTRUCTURE ADMINISTRATOR | OVERALL RESOURCE SCREEN | VIRTUAL SERVER 2 | 10 | VIRTUAL SERVER |
| D.10 | INFRASTRUCTURE ADMINISTRATOR | OVERALL RESOURCE SCREEN | SERVER 2 | 10 | PHYSICAL SERVER |
| D.11 | INFRASTRUCTURE ADMINISTRATOR | OVERALL RESOURCE SCREEN | Volume3 | 10 | Volume |
| D.12 | INFRASTRUCTURE ADMINISTRATOR | OVERALL RESOURCE SCREEN | Volume4 | 10 | Volume |

Fig.14A

| DISPLAY AREA ID 1401 | ROLE 1402 | MANAGEMENT SCREEN 1403 | DISPLAY-TARGET MANAGEMENT EQUIPMENT ID 1404 | DISPLAYABLE AREA 1405 | UNNEEDED LABEL 1406 |
|---|---|---|---|---|---|
| D.13 | INFRASTRUCTURE ADMINISTRATOR | TENANT MANAGEMENT SCREEN | APPLICATION 1 | 15 | TENANT, APPLICATION |
| D.14 | INFRASTRUCTURE ADMINISTRATOR | TENANT MANAGEMENT SCREEN | VIRTUAL SERVER 1 | 15 | TENANT, VIRTUAL SERVER |
| D.15 | INFRASTRUCTURE ADMINISTRATOR | TENANT MANAGEMENT SCREEN | SERVER 1 | 15 | TENANT, PHYSICAL SERVER |
| D.16 | INFRASTRUCTURE ADMINISTRATOR | TENANT MANAGEMENT SCREEN | Volume1 | 15 | TENANT, Volume |
| D.17 | INFRASTRUCTURE ADMINISTRATOR | TENANT MANAGEMENT SCREEN | Volume2 | 15 | TENANT, Volume |
| D.18 | INFRASTRUCTURE ADMINISTRATOR | VIRTUAL SERVER MANAGEMENT SCREEN | VIRTUAL SERVER 1 | 15 | TENANT, APPLICATION, VIRTUAL SERVER |
| D.19 | INFRASTRUCTURE ADMINISTRATOR | VIRTUAL SERVER MANAGEMENT SCREEN | VIRTUAL SERVER 2 | 15 | TENANT, APPLICATION, VIRTUAL SERVER |
| D.20 | INFRASTRUCTURE ADMINISTRATOR | VIRTUAL SERVER MANAGEMENT SCREEN | Volume1 | 15 | TENANT, Volume |
| D.21 | INFRASTRUCTURE ADMINISTRATOR | OVERALL RESOURCE SCREEN | Volume2 | 15 | TENANT, Volume |
| ... | ... | ... | ... | ... | ... |

Fig.14B

| RULE ID 2101 | ACCOUNT 2102 | MANAGEMENT OBJECT TYPE 2103 | LINKING METHOD 2104 | LABEL TYPE 2105 | PRIORITY 2106 |
|---|---|---|---|---|---|
| R.1 | Ac.1 | VIRTUAL SERVER, SERVER |  | LOCATION | 3 |
|  |  |  | _(UNDERSCORE) | TENANT | 1 |
|  |  |  | _(UNDERSCORE) | APPLICATION | 2 |
|  |  |  | -(HYPHEN) | NUMBER | 4 |
| ... | ... | ... | ... | ... | ... |

Fig.21

METHOD OF GENERATING DISPLAY NAME OF OBJECTS TO BE MANAGED

TECHNICAL FIELD

The present invention relates to a technology of generating or changing a screen display name of an object to be managed in a management computer system.

BACKGROUND ART

The number of objects to be managed is increasing considerably and the relation of objects to be managed is becoming complicated pursuant to the widespread use of the virtualization technology, and it is becoming difficult for an infrastructure administrator or a tenant administrator to promptly perform individual identification of objects to be managed on a screen of management software.

For example, when the display names of volumes are automatically numbered only using numerical values by the storage management software, it is not possible to instantaneously determine the information regarding where and for what the volume is being used. Moreover, since a substantial number of objects to be managed are displayed on a single screen, the area of the display name of individual objects to be managed will become small and only a part of the display name of the object to be managed can be displayed and, therefore, individual identification is difficult.

CITATION LIST

Patent Literature

PTL 1: Japanese Patent Application Publication No. 2003-122469

SUMMARY OF THE INVENTION

Problems to be Solved by the Invention

PTL 1 describes a technology of providing an information processing apparatus capable of improving the user's operability by constantly displaying devices in an identifiable state upon displaying information related to the devices on a network.

With this technology, when there are any coinciding parts in the display names of objects to be managed, the information of such coinciding parts is omitted to shorten the display names of objects to be managed, and the identification of the objects to be managed can thereby be facilitated even in cases where the display area is small.

In order for an administrator to identify an object, it is important for the administrator to be able to determine what the object is from its display name. Nevertheless, since a scheme of omitting character strings that coincide in the display names of a plurality of objects to be managed merely eliminates the redundancy of the character strings and does not go as far as comprehending the meaning or contents of the display name, the foregoing scheme does not contribute to the generation of a display name possessing readability where the administrator can promptly identify the object to be managed; that is, the foregoing scheme does not contribute to the generation of a so-called Human-Readable display name.

Means to Solve the Problems

Thus, the present invention acquires, from topology information of the system of the objects to be managed, client information (tenant information or the like) that is related to the management objects to be displayed and a display name of IT equipment/parts or application which may be used together with the information of the objects to be managed, assigns a priority to the display name, and manages the result as relevant information. The management software adjusts the length of the display name by adding or deleting information to or from the display name according to the priority to match the size of the display area where the display name of the object to be managed is to be displayed.

Advantageous Effects of the Invention

According to the present invention, an infrastructure administrator or a tenant administrator can promptly identify the objects to be managed, and it is thereby possible to shorten the operation time.

BRIEF DESCRIPTION OF DRAWINGS

FIG. 7A is an explanatory diagram showing an example of the management object table.

FIG. 7B is an explanatory diagram showing an example of the management object table.

FIG. 8A is an explanatory diagram showing an example of the association table.

FIG. 8B is an explanatory diagram showing an example of the association table.

FIG. 9 is an explanatory diagram showing an example of the topology table.

FIG. 10 is an explanatory diagram showing an example of the account table.

FIG. 11 is an explanatory diagram showing an example of the label rule table.

FIG. 12 is an explanatory diagram showing an example of the label table.

FIG. 13 is an explanatory diagram showing an example of the pattern table.

FIG. 14A is an explanatory diagram showing an example of the screen information table.

FIG. 14B is an explanatory diagram showing an example of the screen information table.

FIG. 21 is an explanatory diagram showing an example of the label rule table.

DESCRIPTION OF EMBODIMENTS

Figure 1:
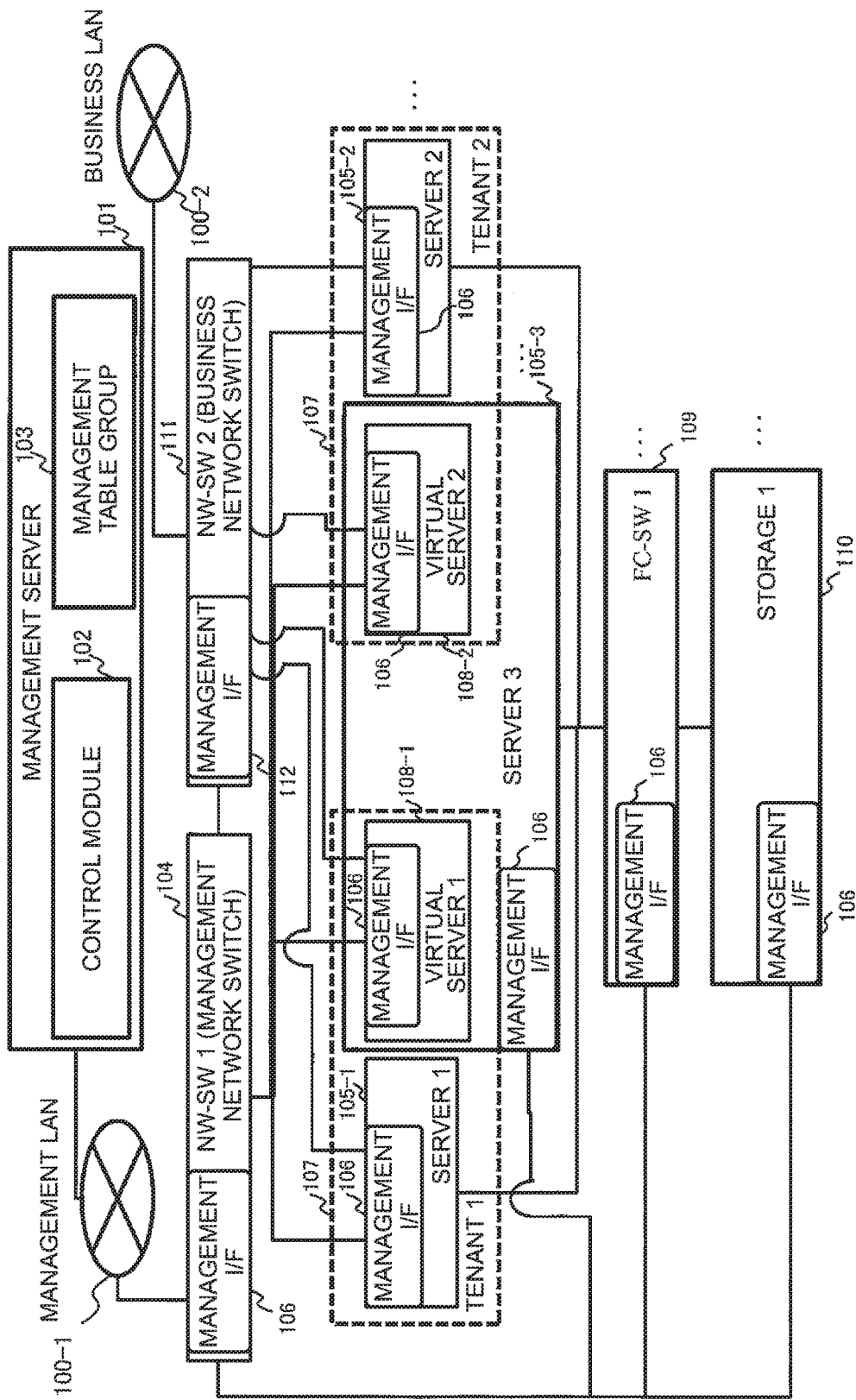
FIG. 1 is a block diagram showing an example of the computer system.

An embodiment of the present invention is now explained with reference to the appended drawings.

In the ensuing embodiments, since components that have the same structure and are given the same reference numeral generally perform the same operation, the redundant explanation thereof is omitted. Moreover, the processing explained below is performed by the respective pieces of hardware through association. Moreover, each type of processing may also be realized with hardware such as an integrated circuit as the processing unit to perform such processing. Furthermore, the programs (including modules) as the basis of executing the processing may be stored in advance in a storage device within the computer or in an external storage device, or may be loaded into an external storage device as needed through a removable storage medium or a communication medium (wired, wireless or optical network, or carrier waves or digital signals on such network).

Moreover, if the ID in the tables used in the ensuing embodiments can be identified based on other independent columns or the combination of other columns in the table, the column of that ID may be omitted. Moreover, as the ID, an identification number in ascending order may also be automatically assigned as the identifier.

Embodiment 1

FIG. 1 is a block diagram showing an example of the computer system of the first embodiment of the present invention. A management server 101 is connected, via a management LAN 100-1 and a NW-SW (management network switch) 104, to a management interface (management I/F) 106 of a NW-SW 104, a management interface 106 of a NW-SW (business network switch) 111, a management interface 106 of a FC (Fibre Channel)-SW 109, a management interface 106 of servers 105-1 to 105-3, a management interface 106 of virtual servers 108-1 to 108-2, and a management interface 106 of a storage apparatus 110. Note that each management interface 106 is an interface for sending information of each piece of equipment according to an inquiry from the management server 101 and, for instance, a network interface described later may be adopted.

The management LAN 100-1 and the NW-SW 104 configure a network for the management server 101 to manage a plurality of servers 105-1 to 105-3. Note that, in the ensuing explanation, the servers 105-1 to 105-3 are collectively referred to as the server 105, and the virtual servers 108-1 to 108-2 are collectively referred to as the virtual server 108.

The management server 101 operates and manages the distribution of the OS and application that run on the server 105 and the power supply control of the server 105. The NW-SW 111 configures a business network, and is a network that is used by the business application that is executed in the server 105 and the virtual server 108. Note that the NW-SW 111 communicates, via the business LAN 100-2, with an external client computer of the computer system connected via a WAN or the like.

A control module 102 as a program is executed in the management server 101, and refers to and updates a management table group 103. The management table group 103 is updated or set as described later by the control module 102.

A tenant 107 is an area that is demarcated and managed by the management server 101, and shows a range of the computer resource that has been assigned to a tenant administrator. The tenant administrator may freely use the computer resource that has been assigned to oneself within the category determined by an infrastructure administrator.

Figure 2:
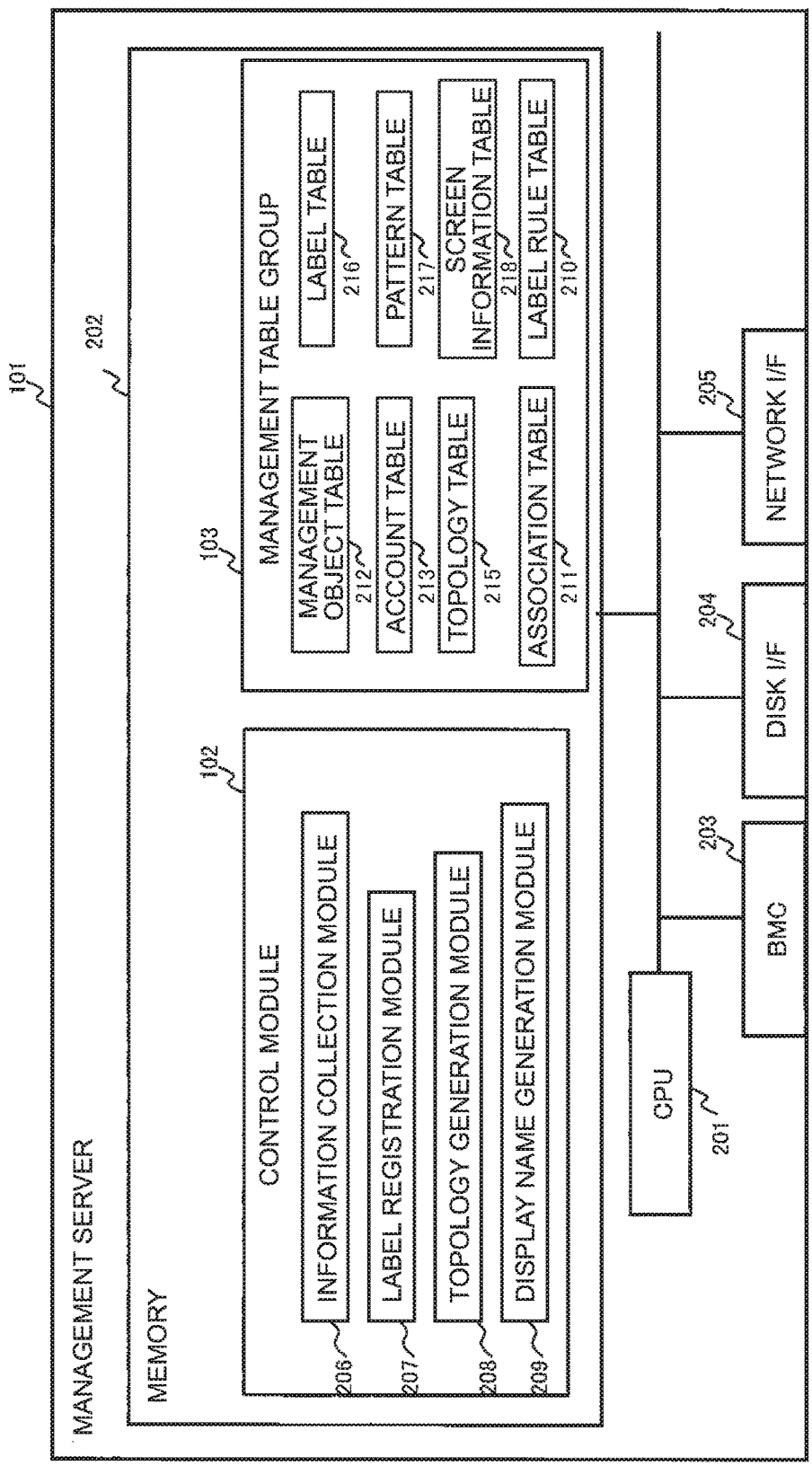
FIG. 2 is a block diagram explaining a hardware configuration and a software configuration of the management server.

FIG. 2 is a block diagram showing the configuration of the management server 101. The management server 101 is configured from a CPU (Central Processing Unit) 201 which performs arithmetic operations, a memory 202 which stores programs to be executed by the CPU 201 and data used in executing the programs, a BMC (Basement Management Controller) 203 which controls the power supply control and the respective interfaces, a disk interface 204 which is used for accessing the storage apparatus 110 or the like storing programs and data, and a network interface 205 which is used for communication via an IP network.

With the management server 101 of FIG. 2, while only one network interface 205 and one disk interface 204 are representatively shown, they may also each be provided in a plurality. For example, different network interfaces 205 may be used for connecting to the management network 100-1 and to the business network 100-2.

The memory 202 stores a control module 102 and a management table group 103.

The control module 102 includes various modules as programs, and specifically includes an information collection module 206 (refer to FIG. 15), a topology generation module 208 (refer to FIG. 16), a label registration module 207 (refer to FIG. 17), and a display name generation module 209 (FIG. 18).

The information collection module 206, the label registration module 207, the topology generation module 208, and the display name generation module 209 are each loaded as a program into the memory 202.

The CPU 201 operates as a function part which realizes a predetermined function by operating according to the respective programs. For example, the CPU 201 functions as the information collection module 206 by operating according to the information collection program. The same applies to the other programs. Furthermore, the CPU 201 also operates as a function part which realizes each of the plurality of types of processing that is executed by the respective programs. The management table group 103 includes a management object table 212 (refer to FIG. 7), an association table 211 (refer to FIG. 8), a topology table 215 (refer to FIG. 9), an account table 213 (refer to FIG. 10), a label rule table 210 (refer to FIG. 11), a label table 216 (refer to FIG. 12), a pattern table 217 (refer to FIG. 13), and a screen information table 218 (refer to FIG. 14).

The information of each table may be automatically generated by the program (function part) in the management server 101, or may be input manually by the user (or management terminal), or may be input by an application that coordinates with the management server 101. An application that coordinates with the management server 101, for example, is configured from a high-order configuration management application.

The types of the management server 101 and the server 105 may be a physical server, a blade server, a virtualized server, or a logically/physically partitioned or a physically partitioned server, and the advantageous effects of this invention can be yielded regardless of which of the foregoing servers is used.

Information of programs and tables that realize the respective functions of the control module 102 may be stored in a storage device such as the storage apparatus 110 or a non-volatile semiconductor memory, a hard disk drive, or an SSD (Solid State Drive), or in a computer-readable non-temporary data storage medium such as an IC card, an SD card, or a DVD.

Figure 3:
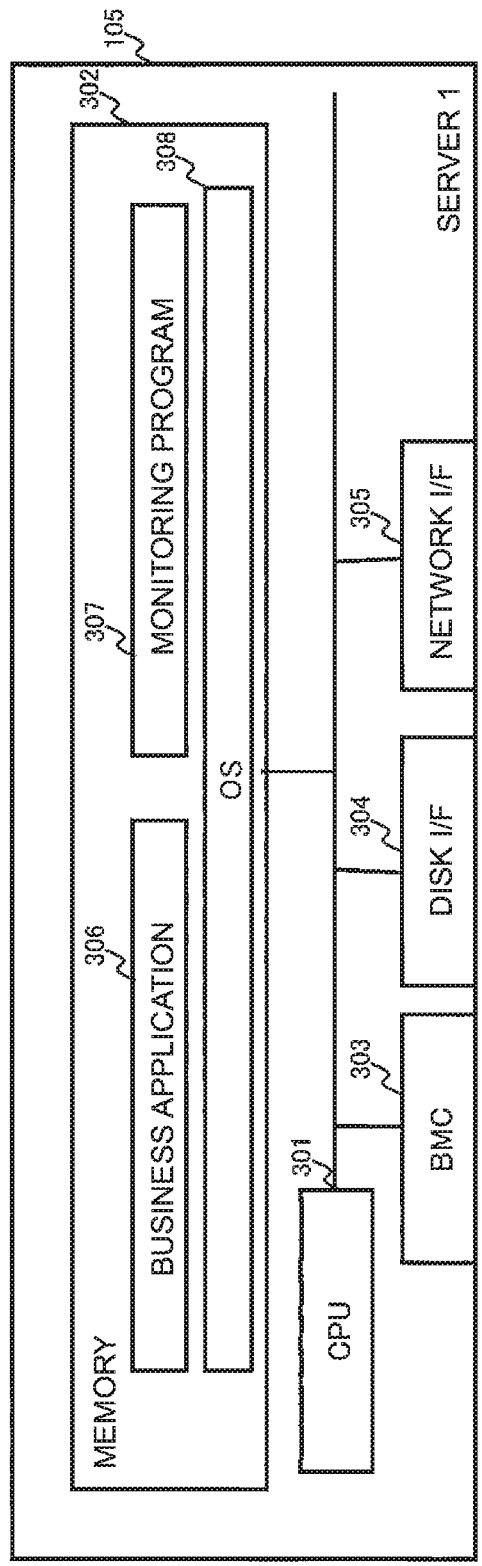
FIG. 3 is a block diagram explaining the hardware configuration and the software configuration of the server.

FIG. 3 is a block diagram showing the configuration of the server 105. The server 105 includes a CPU 301 which performs arithmetic operations, a memory 302 which stores programs to be executed by the CPU 301 and data used in executing the programs, a disk interface 304 which is used for accessing the storage apparatus (or storage sub system) 110 storing programs and data, a network interface 305 which is used for communication via an IP network, and a BMC (Basement Management Controller) 303 which controls the power supply control and the respective interfaces. The OS 308 in the memory 302 is executed by the CPU 301, and the device management is thereby performed by the server 105. The business application 306 and the monitoring program 307 are executed under the control of the OS 308.

In FIG. 3, while only one network interface 304 and one disk interface 305 are respectively shown, they may also each be provided in a plurality. For example, different network interfaces 305 may be used for connecting to the management network 100-1 and the business network 100-2. In this embodiment, the server 105 includes a network interface 305 for connecting to the management network (NW-SW 104) and the business network (NW-SW 111). Moreover, the management I/F 106 (refer to FIG. 1) shows a network interface 305 for management network (NW-SW 104).

Figure 4:
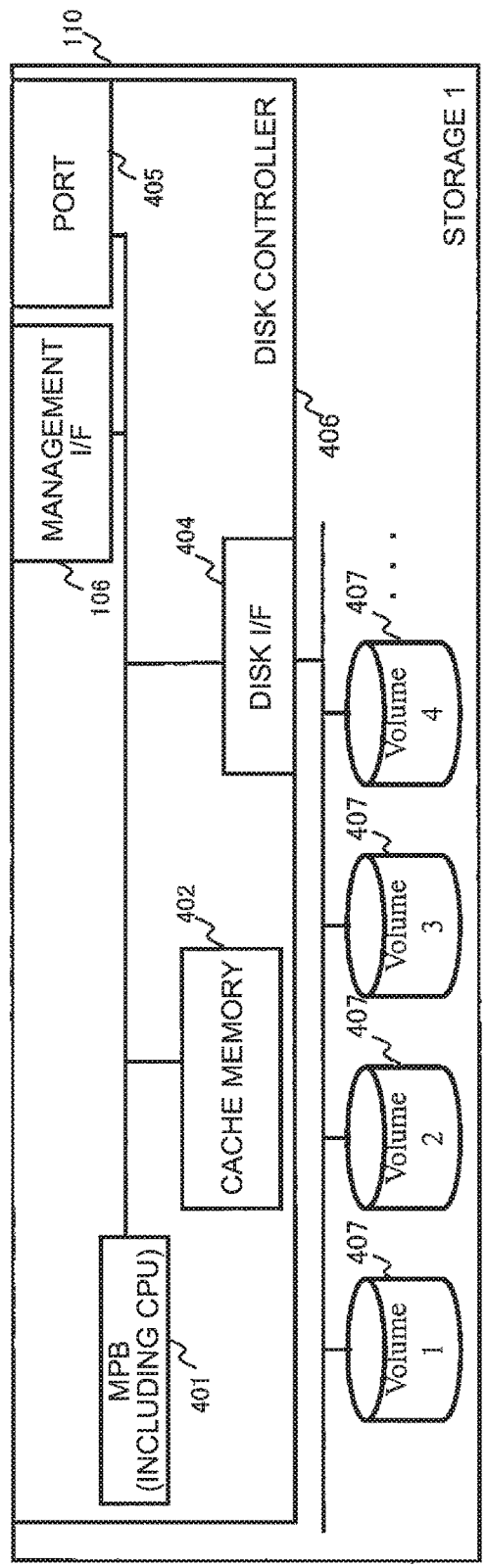
FIG. 4 is a block diagram explaining the hardware configuration and the software configuration of the storage.

FIG. 4 is a block diagram showing the configuration of the storage apparatus 110. The storage apparatus 110 includes a disk controller 406, and the disk controller 406 comprises an MPB (Micro Processor Blade) 401 which performs arithmetic operations, a cache memory 402 which stores programs to be executed by the MPB 401 and data used in executing the programs, a disk interface 404 as an interface for accessing the volume 407 in the storage apparatus 110 or other storage devices, a port 405 which is used for connecting to equipment such as the server 105, and a management I/F 106 which is used by the management server 101 for managing the storage apparatus 110. In FIG. 4, while one disk interface 404, one port 405 and one disk controller 406 are representatively shown, they may also each be provided in a plurality. Note that a network interface may be used as the management I/F 106. Moreover, the storage apparatus 110 includes a volume 407 which stores the programs and data sent from the storage apparatus 110 and equipment connected to the storage apparatus 110.

Figure 5:
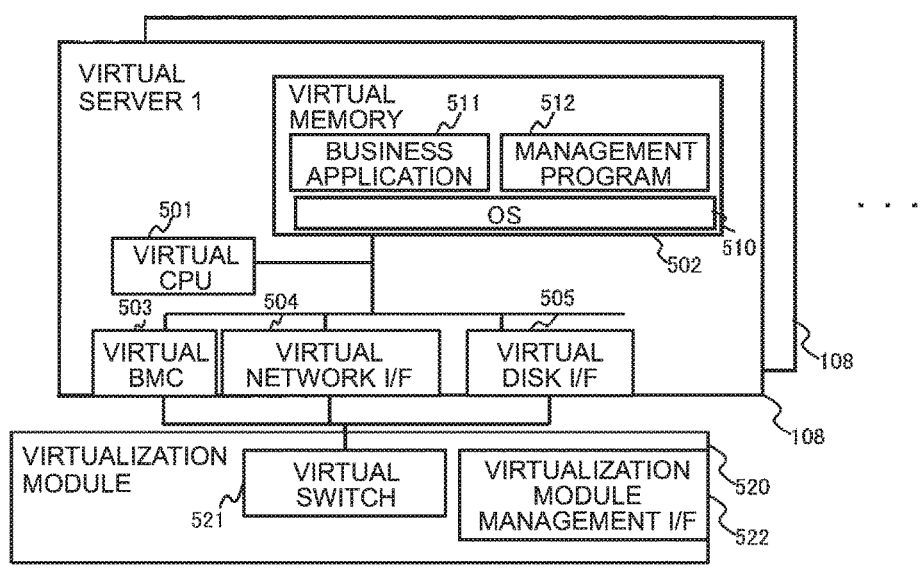
FIG. 5 is a block diagram explaining the hardware configuration and the software configuration of the virtual server.

FIG. 5 is a block diagram showing the hardware configuration and the software configuration of a plurality of virtual servers 108 that are provided by executing the virtualization module 520. The server 105 virtualizes the computer resources of the server 105 with the virtualization module 520, and thereby provides one or more virtual servers 108. Note that the virtualization module 520 is configured, for example, from a hypervisor or a VMM (Virtual Machine Monitor).

The memory 302 stores the foregoing virtualization module 520 which virtualizes the computer resources, and the server 105 provides one or more virtual servers 108. Moreover, the virtualization module 520 comprises a virtualization unit management interface 522 as a control interface. The virtualization module 520 configures the virtual server 108 by virtualizing the computer resources of the server 105.

The virtual server 108 is configured from a virtual CPU 501, a virtual memory 502, a virtual network interface 504, a virtual disk interface 505, and a virtual VMC 503. The virtual memory 502 stores an OS 510, and a virtual device group in the virtual server 108 is thereby managed. Moreover, a business application 511 is being run on the OS 510. Failure detection, power supply control of the OS, and inventory management are provided by the management program 512 running on the OS 510.

The virtualization module 520 manages the association of the physical computer resources of the server 105 and the virtual computer resources. The virtualization module 520 includes a virtual switch 521 for performing communication among a plurality of virtual servers 108. The virtual switch 521 can connect the physical interface of the server 105 to a plurality of virtual servers 108. The virtual server 108 is able to thereby connect with the external equipment of the server 105 via the interface of the server 105.

The virtualization unit management interface 522 is an interface for the virtualization module 520 to communicate with the management server 101, and is used for notifying information from the virtualization module 520 to the management server 101, or sending instructions from the management server 101 to the virtualization module 520. Moreover, the virtualization unit management interface 522 can also be used directly from a user terminal (not shown) or the like.

Figure 6:
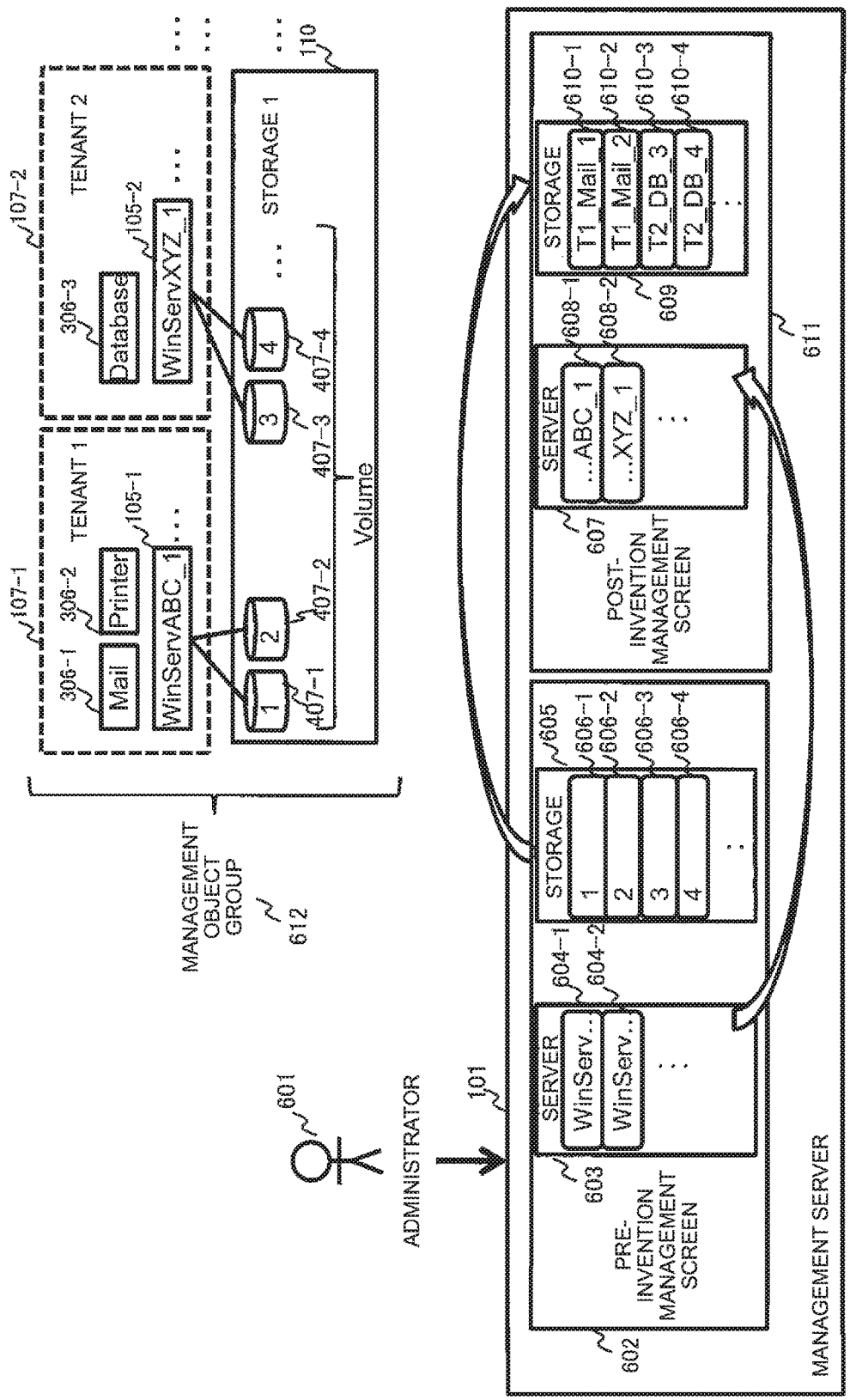
FIG. 6 is a diagram showing the overview of the processing performed in the computer system.

FIG. 6 shows an overview of an example of the processing to be performed in the present invention.

The management server 101 is managing a management object group 612. The management server screen 602 is an example representing a management screen before applying the present invention, and includes a server management screen 603 and a storage management screen 605. Moreover, the server management screen 603 includes a screen display area 604-1 and a screen display area 604-2 which respectively represent a server 105-1 and a server 105-2 of the management object group. The storage management screen 605 includes screen display areas 606-1 to 606-4 which respectively represent volumes 407-1 to volume 407-4 in the storage 110 of the management object group 612. The management server screen 611 is an example of a management screen after applying the present invention, and includes a server management screen 607 and a storage management screen 609. Moreover, the server management screen 607 includes a screen display area 608-1 and a screen display area 608-2 which respectively represent a server 105-1 and a server 105-2 of the management object group 612. The storage management screen 609 includes screen display areas 610-1 to 610-4 which respectively represent volumes 407-1 to 407-4 in the storage 110 of the management object group 612.

The management object group 612 includes, as an example of objects to be managed, a tenant 107-1 and a tenant 107-2, and the storage 110. Moreover, the tenant 107-1 includes a server 105-1 including business applications 306-1 and 306-2. Similarly, the tenant 107-2 includes a server 105-2 including a business application 306-3.

The administrator 601 comprehends the objects to be managed of the management object group 612 from the management screen 602 that was output from the management server 101. With the pre-invention management screen 602, while there are text boxes representing the server 604-1 and the server 604-2 of the management object group 612 displayed on the server management screen 603, because the display names are long, the display names are cut off midway and, because the cut-off display names are the same, the server 604-1 and the server 604-2 cannot be differentiated. Meanwhile, while there are text boxes 606-1 to 606-4 representing the Volume 407-1 to the Volume 407-4 of the management object group 602 on the storage management screen 605 of the pre-invention management screen 602, the display names are configured only from numbers and there is no information as to which Volume is being used by which server, and the administrator is unable to tell to which server the information has been assigned.

The post-invention management screen 611 shows the management screen after applying the present invention to the pre-invention management screen 602. With the server management screen 607 of the management screen 602, while the information of the server displayed in the text box 604-1 and the text box 604-2 of the server management screen 603 is the same, the display names have been changed. The display names have been changed so that the text box 608-1 and the text box 608-2 can be respectively differentiated and, because information related to the server is also displayed, the administrator is able to differentiate the servers. Moreover, while the text boxes 610-1 to 610-4 of the storage screen 609 are of the same information of the Volumes as the text boxes 606-1 to 606-4 displayed on the storage management screen 605, the display names have been changed as with the foregoing server management screen. The administrator 601 is thereby able to obtain information regarding for what the Volume is being used.

FIG. 7A and FIG. 7B are explanatory diagrams shown an example of the management object table in Embodiment 1 of the present invention.

The management object table 212 stores configuration information and other information of the equipment to be managed. Specifically, the management object table 212 includes a management object ID 701, a display name 702, a management IP 703, OS information 704, a model 705, a management object type 706 and the like. Otherwise, while not shown in the diagrams, the management object table 212 may also include authentication information such as the user name and password for accessing the objects to be managed, and configuration information and performance information of the CPU and memory of the objects to be managed.

Figure 19:
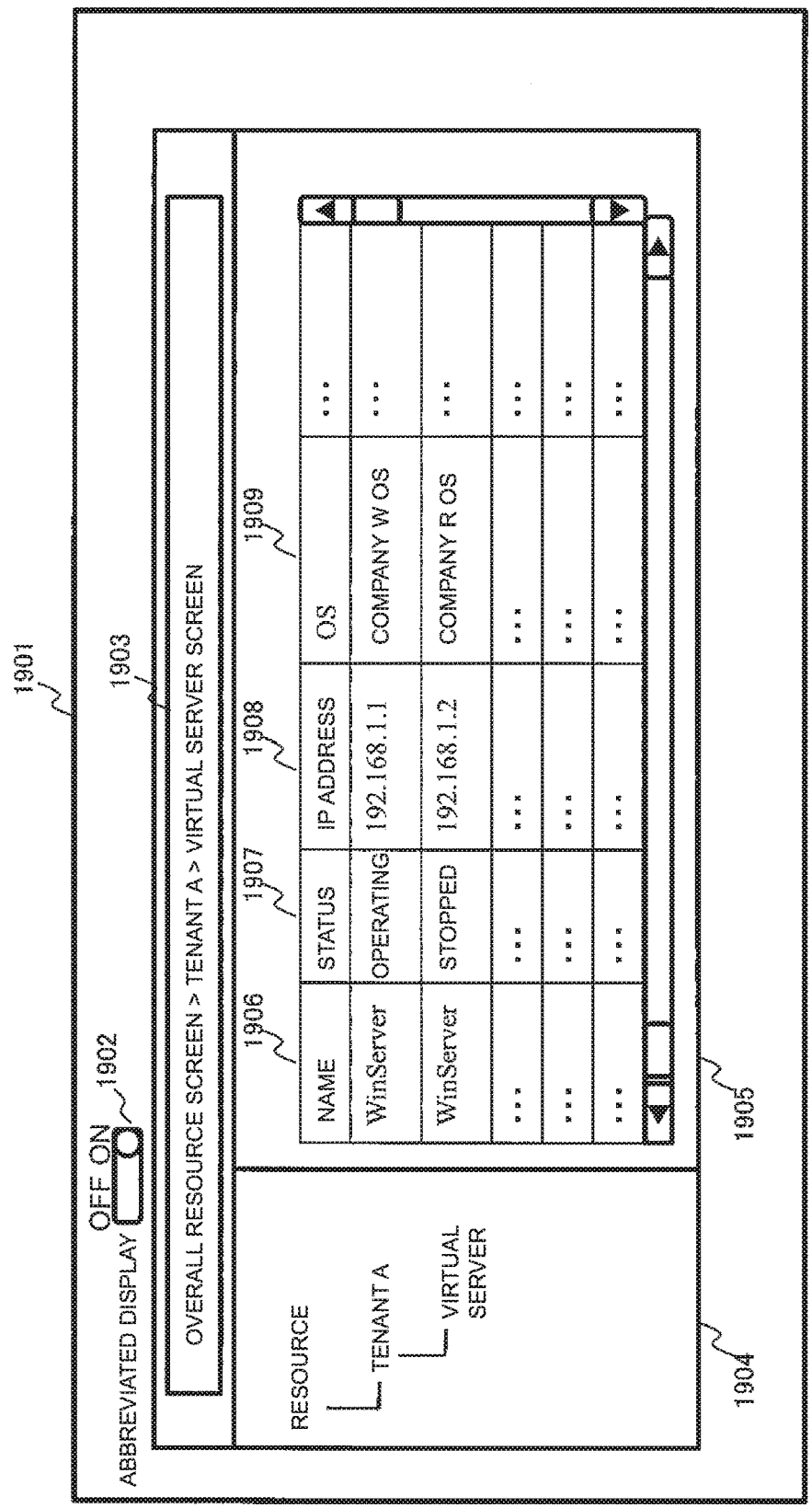
FIG. 19 is a diagram explaining an example of the display screen of the management server.
Figure 20:
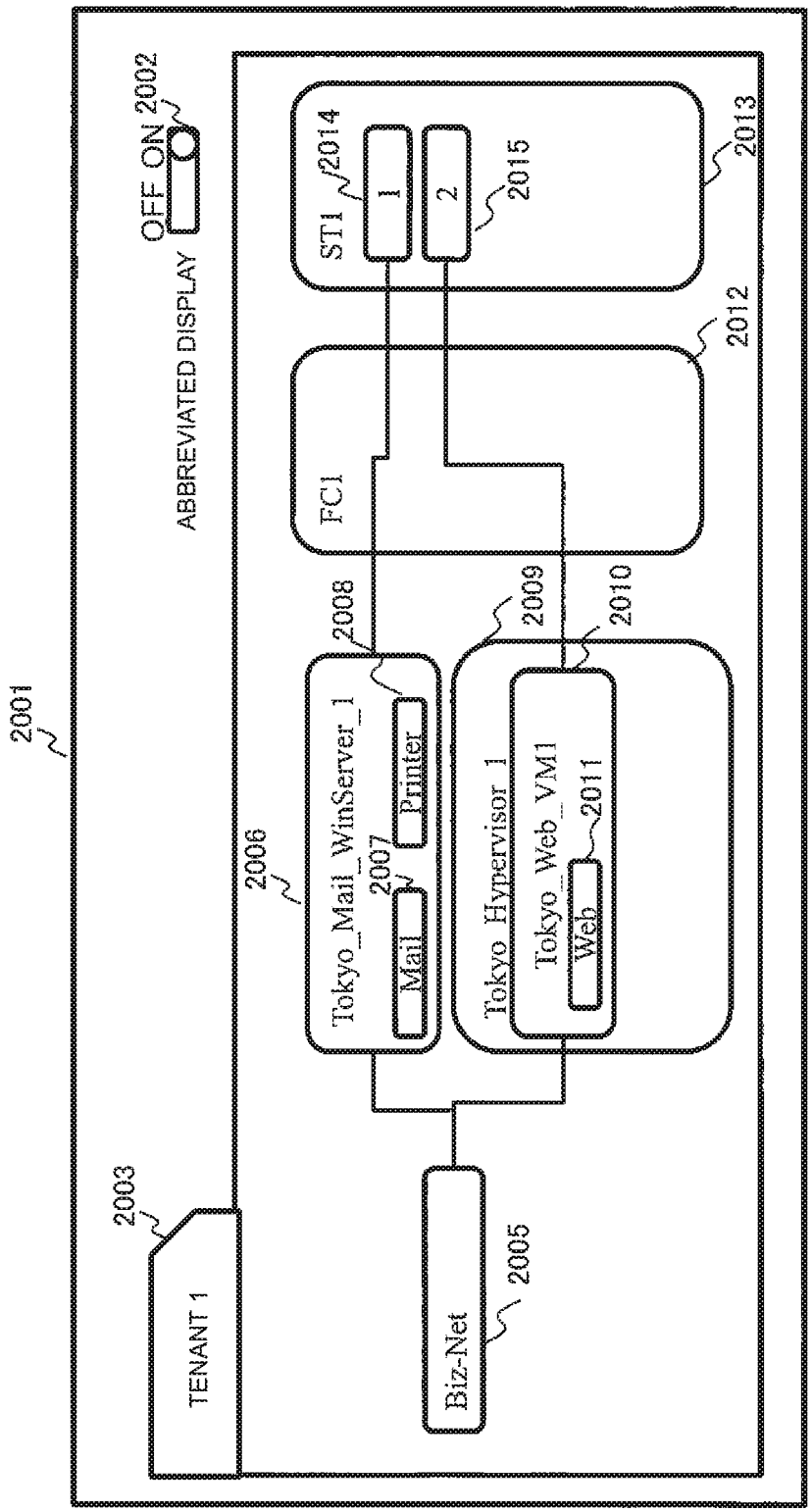
FIG. 20 is a diagram explaining an example of the display screen of the management server.

The management object ID 701 stores identifiers for uniquely identifying the objects to be managed such as a server, storage, network switch or FC switch in the computer system managed by the management server 101. The display name 702 stores the names to be displayed when the objects to be managed are output to the screen or the like of the management server 101. The first display name to be stored here may be named by the administrator, or automatically assigned by the management server 101 or the OS running on the object to be managed. The display names are displayed on the GUI as shown in FIG. 19 and FIG. 20 described later by the display program stored in the memory of the management server (not shown).

The management IP address 703 stores the management IP address assigned to the object to be managed. The management server 101 connects to the equipment to be managed based on the management IP address.

The OS 704 stores the OS information of the object to be managed.

The model 705 stores information related to the model of the object to be managed. The information stored in the model 705 is information related to the infrastructure, and the manufacturer, performance, limit of configurable system and other matters of the equipment to be managed can be comprehended based on this information.

The management object type 706 stores information related to the type of the object to be managed. For example, information on whether the object to be managed is a physical server or a virtual server is stored in the management object type 706.

FIG. 8A and FIG. 8B are explanatory diagrams showing an example of the association table in Embodiment 1 of the present invention.

The association table 211 includes a management object ID 801, an associated node ID 802, tenant information 803, application information 804, and a display necessity flag 805, and stores information of related equipment which is related to the equipment to be managed as the associated node, information of the tenant belonging to the object to be managed, information of the business application that runs on the object to be managed, and information regarding whether the display of equipment to be managed needs to be displayed in the first place.

The management object ID 801 shows the same ID as the foregoing management object table 212. The associated node ID 802 stores the ID related to the object to be managed shown in the management object ID 801; that is, the ID of the physically or logically connected object to be managed. Specifically, this includes cases where the tenant ID and the application ID, or the application ID and the associated node ID, or the associated nodes ID have a relation of the virtualization infrastructure and the virtual server, cases where they have a relation of the server and the business application running on the memory thereof, cases where they have a physical connection relation between the NW-SW and the server, and cases where they have a relation of the tenant and the business application running in the tenant.

The tenant information 803 stores information of the tenant to which the object to be managed identified with the management object ID 801 belongs.

The application information 804 stores information of the business application included in the object to be managed identified with the management object ID 801. The display necessity flag 805 stores information to be used by the tenant administrator or the tenant user to determine whether it is necessary to display the object to be managed identified with the management object ID 801. The display necessity flag may be registered from the beginning, or may be manually set by the administrator.

FIG. 9 is an explanatory diagram showing an example of the topology table in Embodiment 1 of the present invention.

The topology table 215 includes a topology ID 901, a tenant ID 902, an application ID, an application ID 903, and associated node IDs 904 to 910.

The topology ID 901 stores an identifier for uniquely identifying information of the topology representing the relation between the objects to be managed in the computer system managed by the management server 101.

The management object ID 902 stores the tenant information to be used as the base point of the topology. For example, in FIG. 9, a topology is generated with tenant 1 as the base point.

The management object ID 903 stores information of the business application to be used as the base point of the topology.

The associated node IDs 904 to 910 stores information of the associated objects to be managed and starts from the network ID.

Note that, in order to assign a priority to labels described later, the associated node IDs 905 to 910 may also be sorted based on the application ID or the tenant ID after creating the topology information.

Moreover, in addition to storing the simple physical or logical connection between the objects to be managed as the topology, the management server may also store the relation of the objects to be managed that are frequently used together for failure analysis based on RCA (Root Cause Analysis), the relation of the objects to be managed that configure the converged infrastructure in which the server and the storage are integrated, the relation of the objects to be managed which are often simultaneously referred to by the administrator, or the relation of the objects to be managed in which information is often simultaneously referred to based on the management operation history or the like.

FIG. 10 is an explanatory diagram showing an example of the account table in Embodiment 1 of the present invention.

The account table 213 includes an account ID 1001, an account name 1002, role information 1003, and a management object ID 1004.

The account ID 1001 stores an identifier for uniquely identifying the account of the administrator using the management server 101.

The account name 1002 stores the account name of the administrator using the management server 101.

The role information 1003 stores the role information of the administrator using the management server 101. Here, the term "role" is information related to the type of administrator, and shows the administrator's role with regard to the system. Specifically, considered may be a tenant administrator who manages tenants, and an infrastructure administrator who manages the infrastructure.

The management object ID 1004 stores the management object ID of the objects to be managed which are being managed by the administrator of the account ID stored in the account ID 1001.

FIG. 11 is an explanatory diagram showing an example of the label rule table in Embodiment of the present invention.

The term "label" is a character string or a numerical string as a morpheme of the display name of the object to be managed, and is basically an abbreviated version of the ID or display name of the object to be managed which is abbreviated according to the abbreviation method described later. When displaying a certain object to be managed on the management screen, a Human-Readable display name that will fit into the limited display area of the screen can be generated by adding a label of a related object to be managed to the management object to be displayed, or deleting an unneeded label from the management object to be displayed.

The label rule table 210 includes a rule ID 1101, account information 1102, a management object type 1103, an abbreviation method 1104, and a linking method 1105.

The rule ID 1101 stores an identifier for uniquely identifying the generation rule upon generating a label.

The account information 1102 stores the account information of the administrator to which the generation rule of the rule ID 1101 is applied. Depending on the generation rule, a plurality of accounts may refer to the same generation rule. Moreover, in FIG. 11, while the generation rule is determined based on the account information, the generation rule may also be determined for each type of administrator such as the infrastructure administrator or the tenant administrator.

The management object type 1103 stores information regarding the type of object to be managed to be used as the condition for determining whether to apply the generation rule of the rule ID 1101. Depending on the generation rule, there may be cases where the generation rule is applied only in cases of tenant information, or cases where the generation rule is applied only in cases of a virtual server. Moreover, the account may also include a plurality of rules. However, in the foregoing case, the management object type of the rule must not overlap.

The abbreviation method 1104 stores the method of abbreviating the display name of the object to be managed in order to create a label.

This is because a comprehensible abbreviation method may vary depending on the administrator or the management object type. Considered may be the following methods; for instance, leaving the first or last several characters when the display name is a character string, or leasing the first several characters of the character string and leaving the numerical string when a character string and a numerical string are used in combination. For example, when the infrastructure administrator wishes to abbreviate the tenant's display name of "Tenant1" to "Ten1" and use the abbreviated version, the infrastructure administrator registers, as the abbreviation method, information of leaving the first three characters (Ten) and leaving the final character (1). The abbreviation method may be manually registered by the administrator, or be included in the management system as a default setting.

The linking method 1105 stores the linking method in cases of linking labels.

As with the abbreviation method, a comprehensible linking method of labels may vary depending on the administrator or the management object type. For example, when the infrastructure administrator wishes to abbreviate the tenant's display name "Tenant1" to "Ten1" as the label and link it with the application of "hogeDB" to display "Ten1HogeDB", information of Camel Case is registered as the linking method. The linking method may be manually registered by the administrator, or be included in the management system as a default setting.

FIG. 12 is an explanatory diagram showing an example of the label table in Embodiment 1 of the present invention.

The label table 216 includes a label ID 1201, an account ID 1202, a management object ID 1203, a management object label 1204, and a priority 1205.

The label ID 1201 stores an identifier for uniquely identifying the label that may be added to the display name when each administrator views the display name of the object to be managed of the management object ID 1203.

The account ID 1202 is information for identifying the administrator to view the label of the label ID 1201. For example, since the administrator identified with the account ID of Ac.1 and the administrator identified with the account ID of Ac.2 have different label IDs, even if they view the same information of the same object of management, the display name of the object to be managed will be different.

The management object ID 1203 shows the object to be managed by the administrator.

The label 1204 stores the label of the object to be managed. When the administrator (account) or the management object ID is different, there may be cases where the stored information will also be different. This is because the display name or label of the object to be managed that can be easily managed by the administrator is different.

The priority 1205 stores information related to the priority of the label. The priority may be changed based on an input from the user (administrator) or as needed by the management server 101. Note that, in Embodiment 1, the priority is higher as the value is smaller.

Moreover, the label 1204 may include the location, time or user name as items that can also be applied to any object to be managed. Specifically, with regard to the respective objects to be managed, considered may be the ID of the rack where the object to be managed is being stored, location (geographical name) where the object to be managed is installed, name of the data center where the object to be managed is installed, time that the object to be managed was created or added, and user name of the user to use the object to be managed.

FIG. 13 is an explanatory diagram showing an example of the pattern table 217 in Embodiment 1 of the present invention.

The term "pattern" refers to a format to which the display name of the object to be managed is applied in order to confirm whether it is a Human-Readable display name, and is represented using an evaluation formula or the like. For example, when determining whether the character strings of two display names (display name A, display name B) coincide, a pattern of an evaluation formula of display name A=display name B is used. Moreover, when determining whether the display name is configured only from numbers, a pattern of an evaluation formula of display name A=[0-9]+ is used. This pattern determines whether the display name is a numerical string in which only numbers of 0 to 9 are lined up in an arbitrary quantity.

The pattern table 217 includes a pattern ID 1301, role information 1302, a pattern 1303, an evaluation formula 1304, and measures to be taken 1305.

The pattern ID 1301 stores an identifier for uniquely identifying the pattern information for determining whether the display name of the object to be managed can be easily read by the administrator, and whether it is a Human-Readable display name.

The role information 1302 stores information regarding the type of administrator to which the pattern stored in the pattern ID is applied. In FIG. 13, the role information 1302 is classified for each type of administrator such as the tenant administrator or the infrastructure administrator, but the pattern may also be set for each administrator by using the account ID (refer to FIG. 10).

The pattern 1303 stores the explanation of the pattern to be applied to the display name of the object to be managed. For example, the pattern of "only numbers" shows whether the display name is configured only from numbers, and whether it is a Human-Readable display name. For example, when the pattern coincides with the administrator's role, it is determined that the display name is not a Human-Readable display name.

The evaluation formula 1304 stores the evaluation formula to be used upon actually applying the pattern explained in the pattern 1303 to the display name of the object to be managed.

The measures to be taken 1305 show the measures to be taken to the display name of the object to be managed when the evaluated display name of the object to be managed coincides with the pattern.

The patterns registered in the pattern table 217 may be manually set by the administrator, or be included in the management system as default values. Moreover, an unneeded pattern may be deleted or the role of the pattern may be changed.

FIG. 14A and FIG. 14B are explanatory diagrams showing an example of the screen information table in Embodiment 1 of the present invention.

The screen information table 218 includes a display area ID 1401, role information 1402, a management screen 1403, a display-target management equipment ID 1404, a displayable area 1405, and an unneeded label 1406.

The display area ID 1401 stores an identifier for uniquely identifying the area of displaying the display name of the object to be managed on the screen of the management system.

The display area ID 1402 represents the type of administrator to view the display name of the object to be managed in the display area indicated in the display area ID. Note that, in FIG. 14, while the role is represented as an infrastructure administrator or a tenant administrator, the role may also be classified for each administrator by using the account ID (refer to FIG. 10).

The management screen 1403 stores information regarding the type of screen to display the object of management.

The display-target management equipment ID 1404 stores information of the object to be managed to be displayed in the display area. This is the same as the management object ID shown in FIG. 7.

The displayable area 1405 shows the size of the displayable area (for instance, the word count) upon displaying the display name of the object to be managed.

The unneeded label 1406 stores the type of unneeded label upon displaying the display name of the object to be managed. For example, when the infrastructure administrator is to view the object to be managed from the tenant management screen, the tenant is obvious at the point in time that the infrastructure administrator views the tenant management screen and, therefore, a label related to the tenant is not required in the display name. In the foregoing case, "tenant" is designated in the unneeded label 1406.

As a result of using the foregoing tables, the display name of the object to be managed can be displayed, upon adding a label of high priority or deleting a label of low priority, in accordance with the displayable area which will differ depending on the size of the display area of the object to be managed and the management screen.

Figure 15:
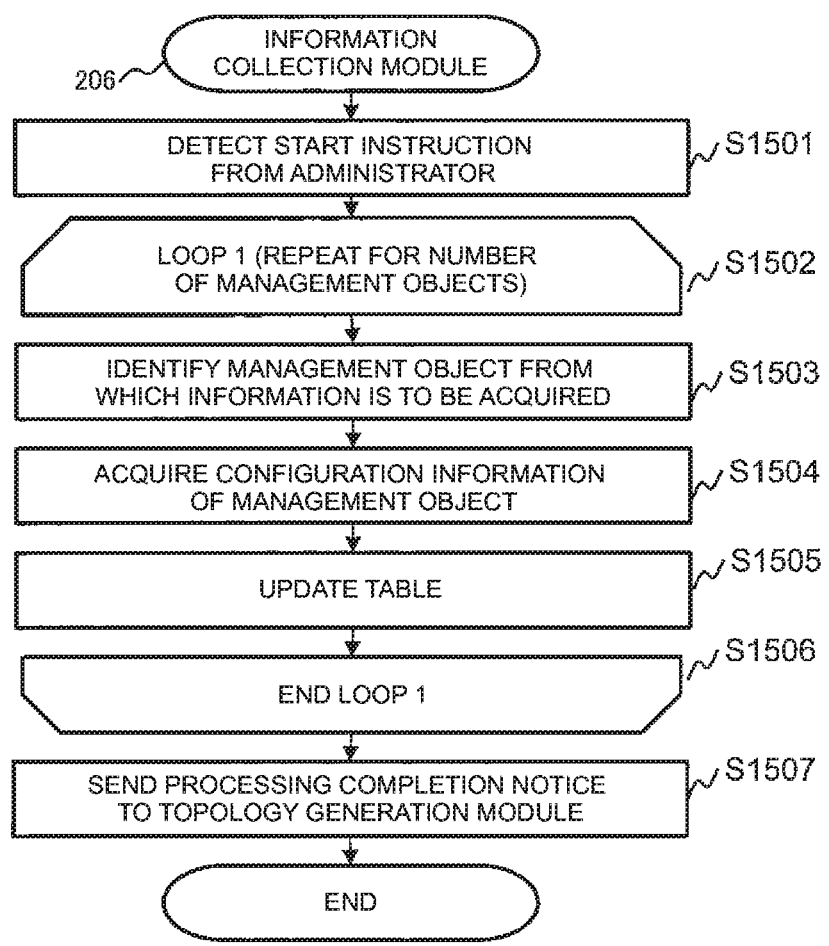
FIG. 15 is a flowchart explaining an example of the processing to be executed by the information acquisition module of the management server.

FIG. 15 is a flowchart explaining an example of the processing to be executed by the information collection module 206 of the management server 101 in Embodiment 1 of the present invention.

The information collection module 206 detects a start instruction of the information collection processing input from the administrator (step S1501).

Note that the trigger for starting the information collection processing is not limited to the detection of the start instruction input from the administrator. For example, the processing may be started after the lapse of a predetermined time based on the schedule function equipped in the management server 101, or the processing may be started periodically, or the processing may be started when the management server 101 detects a change in the configuration of the object to be managed.

Moreover, the start instruction of the information collection processing also includes information for identifying the object of information collection designated by the administrator. Information for identifying the object of information collection processing will suffice so as long as it is information capable of identifying the processing target such as the management object ID.

The information collection module 206 starts the repetitive processing for the number of objects to be managed (step S1502). The information collection module 206 thereafter identifies the object of management from which information is to be acquired (step S1503), and acquires configuration information from the object to be managed (step S1504). The information collection module 206 subsequently writes the acquired configuration information of the object to be managed into the management object table, and thereby updates the information of the management object table and the association table (step S1505). The information collection module 206 thereafter ends the repetitive processing from step S1501 (step S1506). Finally, the information collection module 206 notifies the topology generation module 208 that the information collection processing is complete (step S1507), and then ends the processing of the information collection module.

Based on the foregoing processing, it is possible to acquire the configuration information of the objects to be managed and a management object list related to the objects to be managed stored in the association table.

Figure 16:
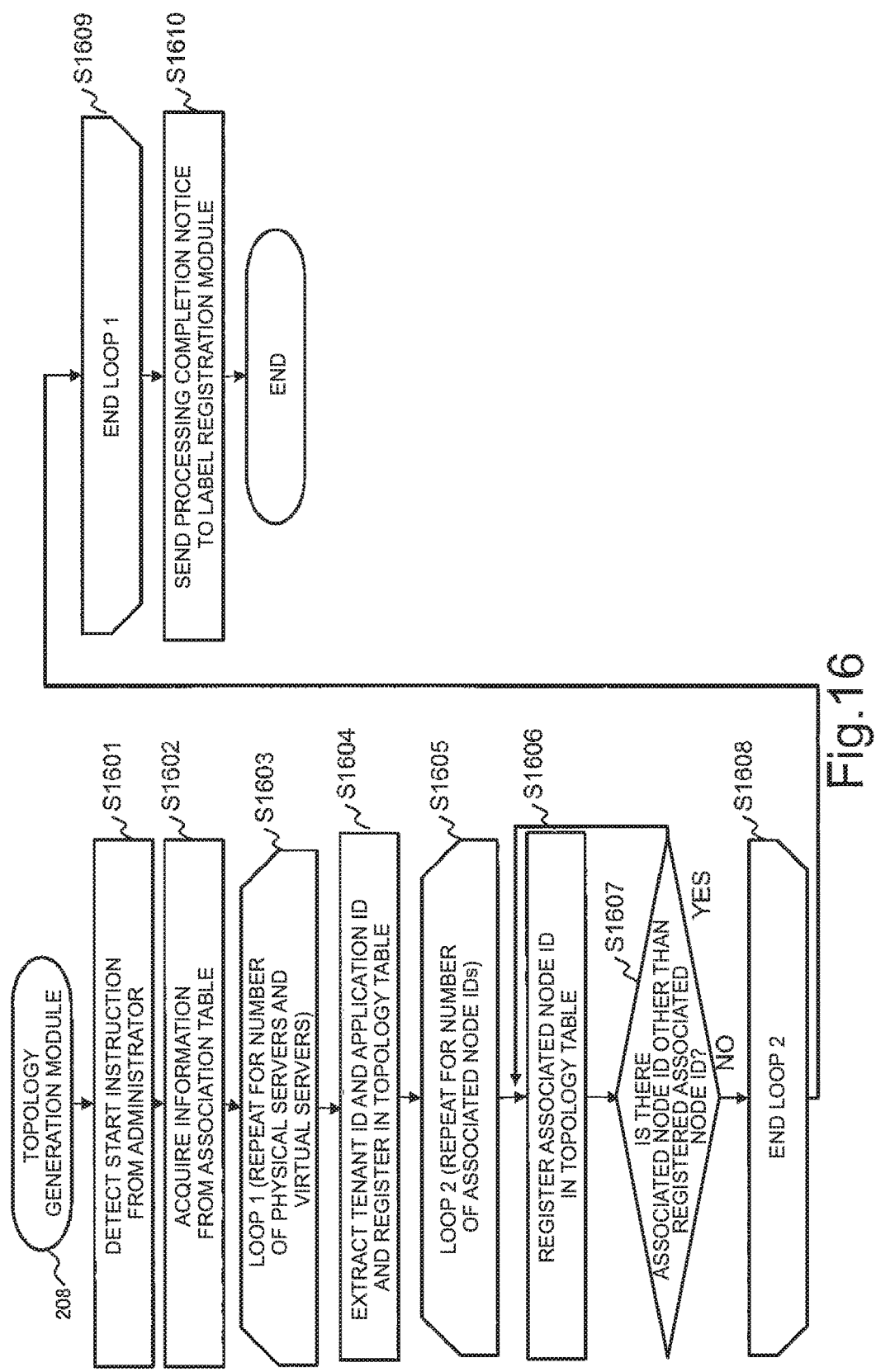
FIG. 16 is a flowchart explaining an example of the processing to be executed by the topology generation module of the management server.

FIG. 16 is a flowchart explaining an example of the processing to be executed by the topology generation module 208 of the management server 101 in Embodiment 1 of the present invention.

The topology generation module 208 detects a start instruction from the administrator (step S1601). Note that the trigger for starting the topology generation processing is not limited to the detection of the start instruction input from the administrator. For example, the processing may be started after the lapse of a predetermined time based on the schedule function equipped in the management server 101, or the processing may be started periodically, or the processing may be started when the management server 101 detects a change in the configuration of the object to be managed.

Subsequently, the topology generation module 208 acquires, from the association table 211, the relevant information (specifically, the management object ID and the associated node ID) of the objects to be managed required for generating the topology (step S1602). The topology generation module 208 thereafter starts the repetitive processing for the number of physical servers and virtual servers registered in the association table 211 (step S1603). Subsequently, the topology generation module 208 extracts the tenant ID and the application ID of the server and registers the extracted tenant ID and application ID in the topology table (step S1604). The topology generation module 208 thereafter starts the repetitive processing for the number of associated node IDs regarding the objects to be managed selected in S1604 (step S1605). Subsequently, the topology generation module 208 registers the selected associated node IDs in the topology table 215 (step S1606). In step S1607, the topology generation module 208 refers to the association table 211 regarding the objects to be managed that correspond to the associated node ID registered in step S1606, and proceeds to step S1606 when there is an associated node ID other than the associated node IDs registered in step S1606, and proceeds to step S1608 in other cases. When all associated node IDs have been processed in step S1608, the topology generation module 208 ends the repetitive processing started from step S1605, and then proceeds to step S1609. When all physical servers and virtual servers have been processed in step S1609, the topology generation module 208 ends the processing started from S1603, and then proceeds to step S1610. In step S1610, the topology generation module 208 sends a processing completion notice to the label registration module.

Based on the foregoing processing, the connection relation of the management object group can be registered as a topology in the topology table 215.

Figure 17:
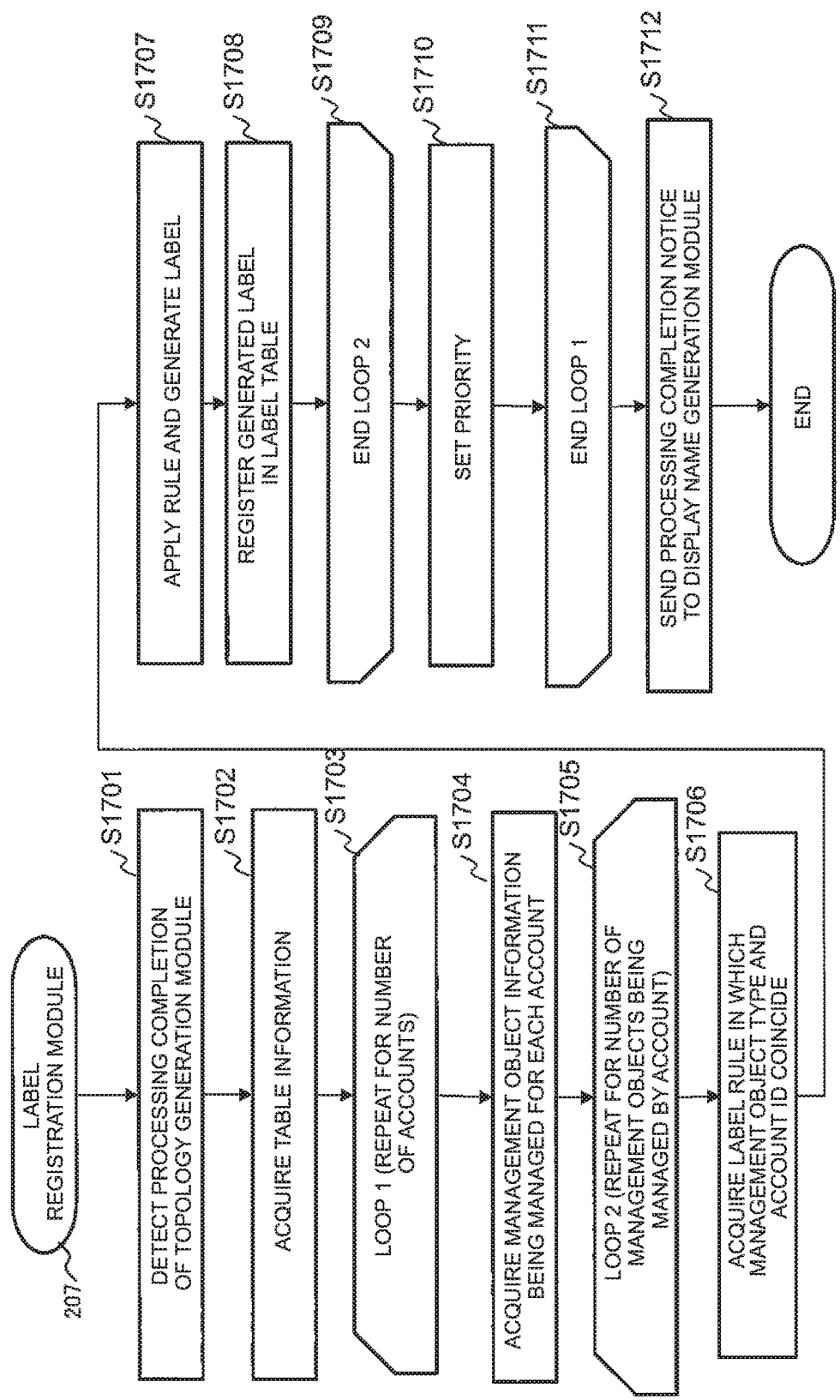
FIG. 17 is a flowchart explaining an example of the processing to be executed by the label registration module of the management server.
Figure 18A:
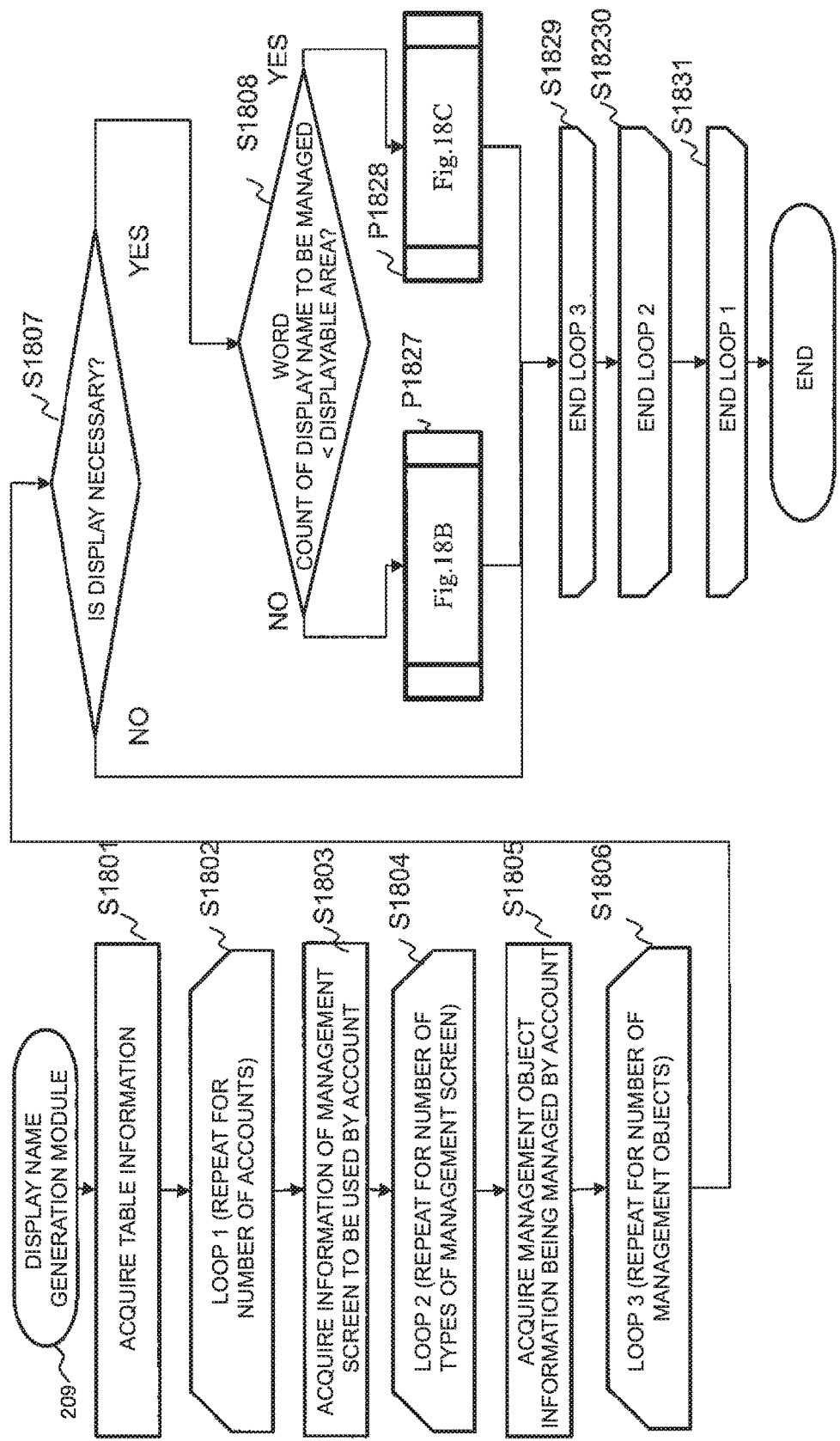
FIG. 18A is a flowchart explaining an example of the processing to be executed by the display name generation module of the management server.
Figure 18B:
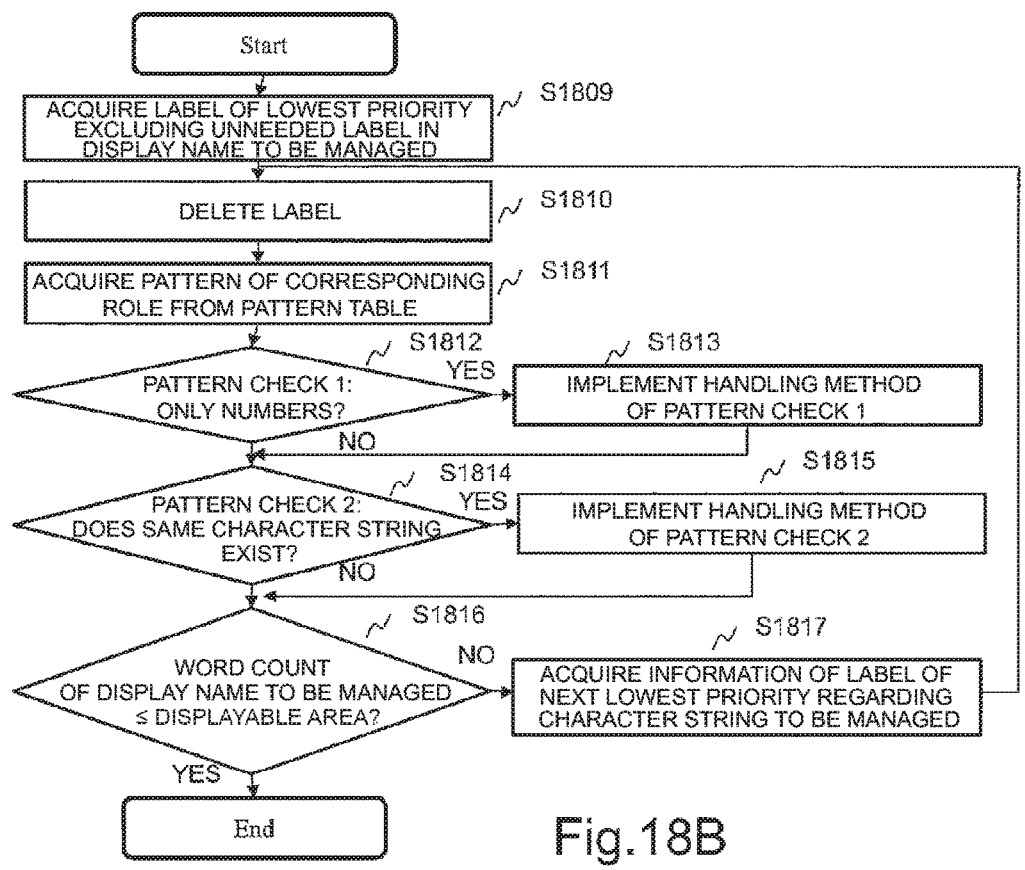
FIG. 18B is a flowchart explaining an example of the processing to be executed by the display name generation module of the management server.
Figure 18C:
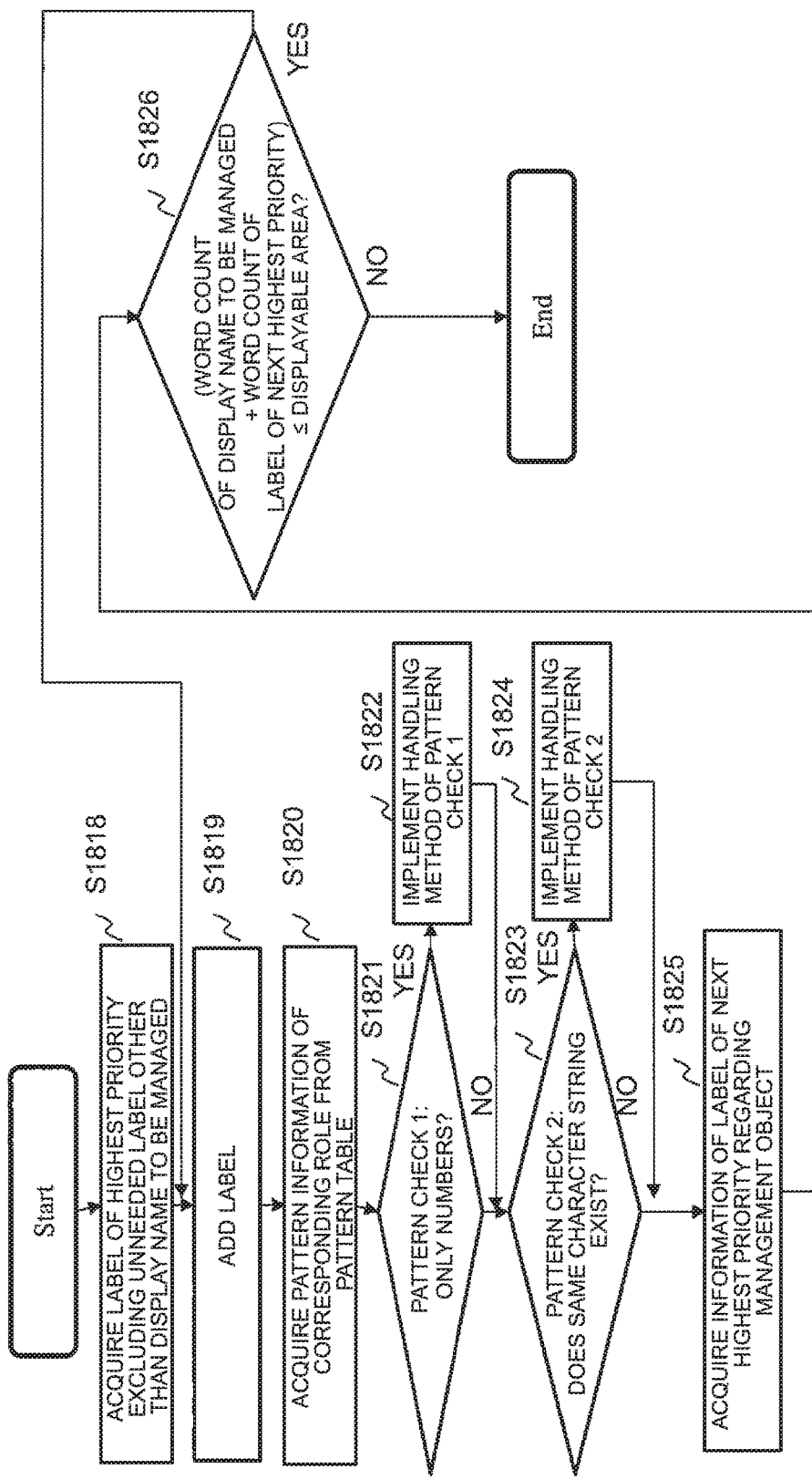
FIG. 18C is a flowchart explaining an example of the processing to be executed by the display name generation module of the management server.

FIG. 17 is a flowchart explaining an example of the processing to be executed by the label registration module 207 of the management server 101 in Embodiment 1 of the present invention.

The label registration module 207 detects the completion notice from the topology generation module 208 (step S1701), and thereafter acquires information of the management object table 212, information of the label rule table 210, information of the account table 213, and information of the topology table 215 (step S1702).

Subsequently, the label registration module 207 starts the repetitive processing for the number of accounts in the account table 213 (step S1703), and then proceeds to step S1704.

The label registration module 207 thereafter acquires information of the object to be managed, which is being managed by the account, from the information of the column of the object to be managed of the account table 213 (step S1704), and starts the repetitive processing for that quantity (step S1705). In step S1706, the label registration module 207 uses the role information of the account table 213 and the information of the management object type acquired from the management object table 212 based on the information of the object to be managed that is linked to the role of the account table 213, and acquires, from the label rule table 210, the generation rule of the label related to both of the foregoing pieces of information. The label registration module 207 thereafter applies the rule acquired in step S1706 to the display name of the object to be managed (step S1707). In step S1708, the label registration module 207 registers the label generated in step S1707 in the label table 216, and then proceeds to step S1709. In step S1709, when the repetitive processing has been performed for the number of objects to be managed, which are managed by the account, the label registration module 207 ends the repetitive processing of step S1705. In step S1710, the label registration module 207 sets the priority in the priority 1205 of the label table 216.

The targets to which the priority is set can be generally classified into two types, and the priority is set by combining the two types of targets. One type is a label in which the tenant and the application are added to a label in which an object to be managed does not exist in the management object group, such as tenant information, application information, location information, or time information. All of these labels are likely to be Human-Readable labels for the administrator. The other type is the label having an object to be managed in the management object group, excluding the tenant and the application. In the ensuing explanation, the former is referred to as "environment information" and the latter is referred to as "relevant information". For example, since "server 1" exists in the management object group, it corresponds relevant information, and "tenant 1" exists in the management object group but because it is Human-Readable, it corresponds to environment information. Furthermore, "tokyo" is a term that is used in the display name and indicates the location where the object to be managed exists, and corresponds to environment information since it does not exist in the management object group.

Foremost, since environment information is basic management information, it is generally set to have a priority that is higher than relevant information. Nevertheless, the priority may be kept low for each administrator or for each role, or the setting may be changed by deeming it to be an unneeded label. Specifically, the setting may be changed based on the service used by the administrator (for instance, tenant management or infrastructure management), the priority of information which is frequently referred to by the administrator may be set high, the priority of information which is not frequently referred to by the administrator may be set low, or it may be deemed to be an unneeded label.

The priority of relevant information is determined by using the relevant information of the equipment of the topology table 215. In the topology table 215, the tenant ID and the application ID are environment information. Foremost, the label registration module 207 determines whether the tenant ID as the environment information is an object to be managed. When the tenant ID is an object to be managed, the highest priority is assigned. Subsequently, the label registration module 207 refers to the application ID, which is the right field of the tenant ID, and determines whether the application ID is an object to be managed. When the application ID is an object to be managed, the next highest priority is assigned. Furthermore, the same processing is also performed regarding the right field, and this is repeated up to the right end of the topology entry. Subsequently, the label registration module 207 repeats the same processing for the subsequent topology entry, and continues this until a priority is assigned to all objects to be managed by the administrator to reflect the priority of the association table. Note that, with regard to the environment information excluding the tenant and the business application, a priority is set by performing processing that is separate from the foregoing processing, and reflected in the label of the association table.

For example, in cases where the account name is "Alice", the object to be managed can be derived from the account table. The topology table is consequently referred to from the high-ranking entry. Foremost, the leftmost field in the uppermost entry of the topology table is the tenant, and "tenant 1" is stored therein. Since this is an object to be managed by Alice, the highest priority is assigned to "tenant 1". Next, the right field is the application ID, and "business application 1" is stored therein. Since this is also an object to be managed by Alice, the next highest priority is assigned to "business application 1" after "tenant 1". This processing is repeated until a priority is assigned to all objects to be managed by Alice. Consequently, in cases of being used by Alice, it is possible to create a state where a priority is assigned to all labels. Note that the setting of priority is not limited to the order of topology, and the user (administrator) may apply a weight to the tenant ID, the application ID, the network node ID and the node ID of the topology table 215, and the priority may be changed based on such weight. If repetitive processing has been performed for the number of accounts in step S1711, the label registration module 207 ends the repetitive processing of step S1703.

Finally, the label registration module 207 sends a processing completion notice to the display name generation module (step S1712).

Based on the foregoing processing, it is possible to generate a label to be used in displaying the object to be managed, and register the generated label in a table. Moreover, based on the foregoing processing, since it is possible to add information, in ascending order of importance, to information which is required by the administrator and to be displayed on the screen, the operability of management software can be improved.

FIG. 18 is a flowchart explaining an example of the processing to be executed by the display name generation module 209 of the management server 101 in Embodiment 1 of the present invention.

The display name generation module 209 acquires, in step S1801, information of the label table 216, the screen information table 218, the account table 213, the pattern table 217, the management object table 212, the association table 211 and the topology table 215.

Subsequently, in step S1802, the display name generation module 209 starts the repetitive processing for the number of accounts registered in the account table 213.

In step S1803, the display name generation module 209 acquires, from the screen information table 218, information of the management screen to be used by the account.

In step S1804, the display name generation module 209 starts the repetitive processing for the number of types of management screens to be used by the account from the information of the management screen to be used by the accounted acquired in step S1803.

Subsequently, in step S1805, the display name generation module 209 acquires, from the account table 213, information of the object to be managed by the account.

In step S1806, the display name generation module 209 starts the repetitive processing for the number of objects to be managed by the account acquired in step S1805.

In step S1807, the display name generation module 209 evaluates whether the display necessity flag 805 of the association table 211 is "necessary" or "not necessary" regarding the object to be managed. When the display necessity flag 805 is "necessary", the display name generation module 209 proceeds to step S1808, and when the display necessity flag 805 is "not necessary", the display name generation module 209 proceeds to step S1829.

In step 1808, the display name generation module 209 acquires the display name of the object to be managed from the display name column 702 of the management object table 212, and compares the acquired display name with the displayable area of the displayable area column 1405 of the screen information table 218. As a result of the comparison, when the word count of the display name of the object to be managed is greater than the displayable area, the display name generation module 209 proceeds to sub process P1827, and when the word count of the display name of the object to be managed is smaller than the displayable area, the display name generation module 209 proceeds to sub process P1828.

In the flowchart (FIG. 18B) of sub process P1827, label information with the lowest priority, excluding the unneeded label indicated in the column 1406 of the screen information table 218 of FIG. 14, in the display name of the object to be managed is acquired in step S1809.

In step S1810, the display name generation module 209 deletes the label acquired in S1809 from the display name of the object to be managed.

In step S1811, the display name generation module 209 acquires pattern information of the role corresponding to the pattern table 217. In the diagram, processing is described on the assumption that information of pattern P.1 and pattern P.2 has been acquired.

In step S1812, pattern P.1 is checked. The display name generation module 209 determines whether pattern P.1, which is the display name of the object to be managed, is configured entirely of numbers. When the display name of the object to be managed is configured only with numbers, the display name generation module 209 proceeds to step S1813. When the display name of the object to be managed is not configured only with numbers, the display name generation module 209 proceeds to step S1814.

In step S1813, measures are taken against the display name of the object to be managed corresponding to the pattern check performed in step S1812. In the case of this Embodiment, the display name of the object to be managed is configured only from numbers and is determined as not being a Human-Readable display name. Thus, as the measures to be taken, label information having the highest priority other than the display name of the object to be managed and configured from a character string other than the label deleted in step S1810 and other than numbers is acquired from the list of labels related to the display name of the object to be managed, and added to the display name. After the foregoing measures are taken, the display name generation module 209 proceeds to step S1814.

In step S1814, pattern P.2 is checked. The display name generation module 209 determines whether a display name, which is entirely the same as the display name of the object to be managed, exists on the management screen. When the same display name as the display name of the object to be managed exists on the management screen, the display name generation module 209 proceeds to step S1815. When the same display name as the display name of the object to be managed does not exist on the management screen, the display name generation module 209 proceeds to step S1816.

In step S1815, measures are taken against the display name of the object to be managed corresponding to the pattern check performed in step S1814. In the case of this Embodiment, the same display name as the display name of the object to be managed exists on the management screen and is determined as not being a Human-Readable display name. Thus, as the measures to be taken, different numbers are respectively added to the end of the display name of the object to be managed and to the end of the same display name. After the foregoing measures are taken, the display name generation module 209 proceeds to step S1816.

In step S1816, the display name generation module 209 determines whether the character string of the display name of the object to be managed is less than or the same as the displayable area. When character string of the display name of the object to be managed is less than or the same as the displayable area, the display name generation module 209 proceeds to step S1829 of the flowchart of FIG. 18A. When character string of the display name of the object to be managed is not less than or not the same as the displayable area, the display name generation module 209 proceeds to step S1817.

In step S1817, since the character string of the display name of the object to be managed does not fit in the displayable area, the display name generation module 209 acquires information of the label of the next lowest priority to additionally delete a label. After the foregoing information is acquired, the display name generation module 209 returns to step S1810 and once again repeats the processing.

In the flowchart (FIG. 18C) of sub process P1828, label information of high priority other than the display name of the object to be managed and excluding the unneeded label indicated in the column 1406 of the screen information table 218 of FIG. 14 is acquired in step S1818.

In step S1819, the display name generation module 209 adds the label acquired in S1818 to the display name of the object to be managed.

In step S1820, the display name generation module 209 acquires pattern information of the role corresponding to the pattern table 217. In the diagram, processing is described on the assumption that information of pattern P.1 and pattern P.2 has been acquired.

In step S1821, pattern P.1 is checked. The display name generation module 209 determines whether pattern P.1, which is the display name of the object to be managed, is configured entirely of numbers. When the display name of the object to be managed is configured only with numbers, the display name generation module 209 proceeds to step S1822. When the display name of the object to be managed is not configured only with numbers, the display name generation module 209 proceeds to step S1823.

In step S1822, measures are taken against the display name of the object to be managed corresponding to the pattern check performed in step S1821. In the case of this Embodiment, the display name of the object to be managed is configured only from numbers and is determined as not being a Human-Readable display name. Thus, as the measures to be taken, label information having the highest priority other than the display name of the object to be managed and configured from a character string other than numbers is acquired from the list of labels related to the display name of the object to be managed, and added to the display name. After the foregoing measures are taken, the display name generation module 209 proceeds to step S1823.

In step S1823, pattern P.2 is checked. The display name generation module 209 determines whether a display name, which is entirely the same as the display name of the object to be managed, exists on the management screen. When the same display name as the display name of the object to be managed exists on the management screen, the display name generation module 209 proceeds to step S1824. When the same display name as the display name of the object to be managed does not exist on the management screen, the display name generation module 209 proceeds to step S1825.

In step S1824, measures are taken against the display name of the object to be managed corresponding to the pattern check performed in step S1823. In the case of this Embodiment, the same display name as the display name of the object to be managed exists on the management screen and is determined as not being a Human-Readable display name. Thus, as the measures to be taken, different numbers are respectively added to the end of the display name of the object to be managed and to the end of the same display name. After the foregoing measures are taken, the display name generation module 209 proceeds to step S1825.

In step S1825, label information of the next highest priority regarding the object to be managed is acquired.

In step S1826, the display name generation module 209 determines whether the total word count of the work count of the display name of the object to be managed and the word count of the label acquired in step S1825 is less than or the same as the displayable area. When the total word count of the work count of the display name of the object to be managed and the word count of the label acquired in step S1825 is less than or the same as the displayable area, the display name generation module 209 proceeds to step S1819. When the total word count of the work count of the display name of the object to be managed and the word count of the label acquired in step S1825 is not less than or not the same as the displayable area, the display name generation module 209 proceeds to step S1829 of the flowchart of FIG. 18A.

In step S1829, when the processing has been repeated and completed for the number of objects to be managed in step S1806, the loop processing is ended.

In step S1830, when the processing has been repeated and completed for the number of types of management screens in step S1804, the loop processing is ended.

In step S1831, when the processing has been repeated and completed for the number of accounts in step S1802, the loop processing is ended.

Note that the trigger for starting the information collection processing may be when a start instruction input from the administrator is detected, the processing may be started after the lapse of a predetermined time based on the schedule function equipped in the management server 101, or the processing may be started periodically, or the processing may be started when the management server 101 detects a change in the configuration of the object to be managed.

Based on the foregoing processing, it is possible to display, as much as possible, information which is Human-Readable and required by the administrator in a limited display area, and thereby improve the operability of management software.

FIG. 19 shows an example of the graphical user interface (GUI) that is displayed by the management server 101 to the administrator in Embodiment 1 of the present invention.

The GUI is used by the user for referring to information of objects to be managed in order to manage such objects to be managed.

Moreover, while omitted in the GUI, the GUI may also include an input interface to be operated for performing the power supply operation of objects to be managed and for changing the configuration of objects to be managed.

The GUI may be displayed on an input terminal (not shown) connected to the management server 101, or a similar GUI may be displayed with an application that is coordinating with the management server 101.

A GUI screen 1901 shows a screen for referring to information of objects to be managed. This screen may display different information for each account of the administrator. For example, when the administrator is a tenant administrator, the screen may display only information of the equipment to be managed by oneself, and hide other information.

A button 1902 is used for determining whether to perform the operation of adding the label of an object to be managed related to the display name of the present invention to the display name of the object to be managed, and when the abbreviated display is OFF, the abbreviated display function of the present invention is not used. When the abbreviated display is ON, the abbreviated display function of the present invention is used.

A box 1903 shows the address information of the GUI screen 1901. In the case of FIG. 19, the screen has changed from the overall resource screen to the tenant A management screen, and is currently displaying the virtual server screen.

A box 1904 shows the address information of the object to be managed in the same manner as the box 1903. In the case of FIG. 19, the screen has changed from the resource screen to the tenant screen, and is currently displaying the virtual server screen.

A box 1905 shows a list of the objects to be managed. In the case of FIG. 19, a list of the virtual servers is displayed.

A column 1906 to a column 1909 show information such as the name (display name), the operating state, the IP address, and the OS related to the objects to be managed. Note that, while omitted in the diagrams, equipment information of the objects to be managed may also be displayed.

The name of the object to be managed of the column 1906 is the target of the present invention. The display area of the name changes depending on the size of the GUI screen 1901 or the size of the columns of boxes 1905, 1906. In accordance with the foregoing change, the present invention enables the display of a Human-Readable name based on the method explained above.

FIG. 20 shows an example of the graphical user interface (GUI) that the management server 101 displays to the administrator of the tenant 1 in Embodiment 1 of the present invention.

The GUI is used by the user for referring to information of objects to be managed in order to manage such objects to be managed. Unlike the GUI illustrated in FIG. 19, the GUI of FIG. 20 expresses the physical or logical relation of the respective equipment using connections or nesting of boxes so that the user can understand such relation on the GUI.

Moreover, while omitted in the GUI, the GUI may also include an input interface to be operated for performing the power supply operation of objects to be managed and for changing the configuration of objects to be managed.

The GUI may be displayed on an input terminal (not shown) connected to the management server 101, or a similar GUI may be displayed with an application that is coordinating with the management server 101.

A GUI screen 2001 shows a screen for referring to information of objects to be managed. This screen may display different information for each account of the administrator. For example, when the administrator is a tenant administrator, the screen may display only information of the equipment to be managed by oneself, and hide other information.

A box 2003 shows the screen for displaying the management information of the tenant. This screen displays a box representing the object to be managed.

A box 2005 represents the NW-SW 111. The box 2005 displays the display name. While not drawn in the diagram, a component such as a port configuring the NW-SW 105 may also be expressed by creating an additional box within the box. Moreover, while the management network switch NW-SW 1 has a connection relation with all objects to be managed, it is omitted in the diagram.

A box 2006 and a box 2009 respectively express the server 105-1 and the server 105-3 described above. The box 2006 and the box 2009 respectively display the display name. Moreover, the box 2006 includes a box 2007 and a box 2008, which respectively express the application running on the physical server 105-1. The box 2009 includes a box 2010 in the box. The box 2010 expresses the virtual server 108-1. Moreover, the box 2010 expresses the application running on the virtual server 108-1 as a box 2011 in the same manner as the physical server of the box 2006.

A box 2012 shows the FC-SW 1. While only the box 2012 is shown in the diagram, a component such as an internal port may also be expressed by creating an additional box within the box 2012.

A box 2013 shows the storage 1. The box 2013 includes a box 2014 and a box 2015, which express the Volume, within the box. The box 2014 and the box 2015 are respectively connected, via the box 2012 showing the FC-SW 1, to the box 2006 expressing the physical server and the box 2010 expressing the virtual server.

With the GUI of FIG. 20, the name of the object to be managed indicated in the box 2005 to the box 2013 is the target of the present invention. The display area of the name changes depending on the size of the GUI screen 2001 or the size of the respective boxes. In accordance with the foregoing change, the present invention enables the display of a Human-Readable name based on the method explained above.

As described above, a Human-Readable display name can be generated and displayed by using the topology information, the administrator information, and the screen information of the object to be managed. Note that the topology table 215 of this Embodiment was explained in a mode where the entire objects to be managed are generated as a topology table triggered by an instruction from the administrator, but the generation of the topology table is not limited to the foregoing mode. As other modes, considered may be temporarily generating a topology table configured from objects to be managed related to the objective of the administrator's operations and the objects to be managed that are related thereto triggered by the administrator's operation on the GUI (for example, when the screen on the GUI changes from a screen that is not displaying the display name of the object to be managed to a screen that displays the display name of the object to be managed, or when the GUI is activated with a screen displaying the foregoing display name as the initial screen). Specifically, considered may be a case of generating a topology table of objects to be managed subject to a failure alert and objects to be managed which are physically or logically connected thereto for the objective of analyzing or identifying the root cause of failure during the occurrence of a failure.

In Embodiment 1, the display name of the object to be managed containing information which is Human-Readable and required by the administrator was generated by abbreviating the management object group of the administrator in the form labels, and combining the labels to match the administrator and the management screen.

Embodiment 2

In Embodiment 1, a label was generated by abbreviating the display name of the object to be managed based on the label rule table 210, and the label was added to or deleted from the display name of the object to be managed according to the priority.

In Embodiment 2, the display name of the object to be managed is analyzed based on a given pattern, and the display name is divided. The character string of the divided display name is used as a label, and the display name of the object to be managed is reconfigured according to the priority.

FIG. 21 is an explanatory diagram showing an example of the label rule table in Embodiment 2 of the present invention.

The label rule table 210 includes a rule ID 2101, account information 2102, a management object type 2103, a linking method 2104, a label type 2105, and a priority 2106.

The rule ID 2101 stores an identifier for uniquely identifying the generation rule upon generating a label.

The account information 2102 stores the account information to be used as the condition for determining whether to apply the generation rule of the rule ID 2101. Depending on the generation rule, a plurality of accounts may refer to the same generation rule. Moreover, in FIG. 21, while the generation rule is determined based on the account information, the generation rule may also be determined for each type of administrator such as the infrastructure administrator or the tenant administrator.

The management object type 2103 stores information regarding the type of object to be managed to be used as the condition for determining whether to apply the generation rule of the rule ID 2101. Depending on the generation rule, there may be cases where the generation rule is applied only in cases of tenant information, or cases where the generation rule is applied only in cases of a virtual server.

The linking method 2104 stores the linking method in cases of linking labels.

The linking method stores the method of linking the character strings as labels. For example, when the naming rule of the server is "location_(underscore) tenant_(underscore) application-(hyphen) number", since there is no character string to be linked before the location, the column of the linking method is blank, and because there is an _(underscore) before the character string of the tenant (between "location" and "tenant"), _(underscore) is indicated as the linking method. The same applies to subsequent applications and numbers.

The label type 2105 expresses the type of label that is generated upon analyzing and dividing the display name of the object to be managed.

The priority 2106 expresses the priority in cases of using the information of the label type 2105 as the display name of the object to be managed. In the diagram, the priority is indicated in ascending order, and the priority is higher as the value is smaller.

As a result of using the foregoing label rule table 210, for instance, when the display name of the object to be managed is "Tokyo_ABC_Web-1", the display name can be analyzed with "Tokyo" as the label of "location" of the third highest priority, "ABC" as the label of "tenant" of the highest priority, "Web" as the label of "application" of the second highest priority, and "1" as the label of "number" of the fourth highest priority.

Subsequently, these labels can be registered in the label table 216 in the same manner as Embodiment 1.

The invention claimed is:

1. A management computer which is connected to a computer system configured from equipment including a computer, a switch and a storage apparatus, and which displays management information of the equipment in a GUI, the management computer comprising:
   a memory including:
   equipment management information which includes an identifier of the equipment and a display name to be displayed on the GUI of the equipment;
   topology information which shows a relation of the equipment;
   a plurality of rules, each rule is associated with one or more pieces of equipment and includes an abbreviation method and a linking method; and
   screen information which includes an identifier of the equipment to be displayed on the GUI of the equipment and a displayable area of the equipment; and
   a processor which executes processing of:
   applying a rule, of the plurality of rules, to a display name associated with one or more pieces of equipment to generate label information, which includes an abbreviation of the display name;
   referring to the equipment management information and the screen information and identifying the display name to be displayed on the GUI; and
   referring to the topology information and the label information and adding or deleting the label to or from the display name so that the display name to be displayed on the GUI fits in the displayable area,
   wherein the label information further includes a priority, and wherein the addition or deletion of the label is performed by additionally referring to the priority.

2. The management computer according to claim 1,
wherein the priority is obtained by referring to the topology information and determining the relation of the equipment and whether predetermined readability is of a high type.

3. The management computer according to claim 2,
wherein the screen information further includes information related to a label that does not need to be displayed on the GUI, and
wherein, in the addition or deletion of the label, the label that does not need to be displayed is deleted.

4. The management computer according to claim 3,
wherein the memory further includes an identifier of a user using the management computer and user management information which includes a purpose of use of the user, and
wherein the screen information further includes a purpose of use of the user.

5. The management computer according to claim 4,
wherein the memory further includes pattern information including the purpose of use of the user, conditions of a display name that is incomprehensible to the user, and measures to be taken when the display name coincides with the conditions, and
wherein the addition or deletion of the label is performed by additionally referring to the pattern information.

6. The management computer according to claim 5,
wherein a relevance of the equipment includes relevance of a physical or logical connection of the equipment, whether the equipment will be simultaneously used during failure analysis, whether the equipment belong to a same converged infrastructure, or an operation history of an administrator in operating the equipment.

7. A display method of displaying management information of a computer system configured from equipment including a computer, a switch and a storage apparatus in a GUI of a management computer,
wherein the management computer includes:
equipment management information which includes an identifier of the equipment and a display name to be displayed on the GUI of the equipment;
topology information which shows a relation of the equipment;
a plurality of rules, each rule is associated with one or more pieces of equipment and includes an abbreviation method and a linking method; and
screen information which includes an identifier of the equipment to be displayed on the GUI of the equipment and a displayable area of the equipment; and wherein the display method includes:
a step of applying a rule, of the plurality of rules, to a display name associated with one or more pieces of equipment to generate label information, which includes an abbreviation of the display name;
a step of referring to the equipment management information and the screen information and identifying the display name to be displayed on the GUI; and
a step of referring to the topology information and the label information and adding or deleting the label to or from the display name so that the display name to be displayed on the GUI fits in the displayable area,
wherein the label information further includes a priority, and
wherein the addition or deletion of the label is performed by additionally referring to the priority.

8. The display method according to claim 7,
wherein the priority is obtained by referring to the topology information and determining the relation of the equipment and whether predetermined readability is of a high type.

9. The display method according to claim 8,
wherein the screen information further includes information related to a label that does not need to be displayed on the GUI, and
wherein, in the addition or deletion of the label, the label that does not need to be displayed is deleted.

10. The display method according to claim 9,
wherein the management computer further includes an identifier of a user using the management computer and user management information which includes a purpose of use of the user, and
wherein the screen information further includes a purpose of use of the user.

11. The display method according to claim 10,
wherein the management computer further includes pattern information including the purpose of use of the user, conditions of a display name that is incomprehensible to the user, and measures to be taken when the display name coincides with the conditions, and
wherein the addition or deletion of the label is performed by additionally referring to the pattern information.

12. The display method according to claim 11,
wherein a relevance of the equipment includes relevance of a physical or logical connection of the equipment, whether the equipment will be simultaneously used during failure analysis, whether the equipment belong to a same converged infrastructure, or an operation history of an administrator in operating the equipment.

* * * * *